US012279019B2

(12) United States Patent
Han et al.

(10) Patent No.: US 12,279,019 B2
(45) Date of Patent: Apr. 15, 2025

(54) METHOD TO SUPPORT ENTV BROADCAST AND UNICAST MODES IN UE

(71) Applicant: QUALCOMM Incorporated, San Diego, CA (US)

(72) Inventors: Bin Han, Beijing (CN); Yiqing Cao, Beijing (CN); Yan Li, Beijing (CN); Lu Gao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/759,026

(22) PCT Filed: Mar. 18, 2020

(86) PCT No.: PCT/CN2020/079836
§ 371 (c)(1),
(2) Date: Jul. 18, 2022

(87) PCT Pub. No.: WO2021/184229
PCT Pub. Date: Sep. 23, 2021

(65) Prior Publication Data
US 2023/0041665 A1 Feb. 9, 2023

(51) Int. Cl.
*H04N 21/61* (2011.01)
*H04N 21/442* (2011.01)
(Continued)

(52) U.S. Cl.
CPC ... *H04N 21/6131* (2013.01); *H04N 21/44245* (2013.01); *H04N 21/4516* (2013.01);
(Continued)

(58) Field of Classification Search
CPC ......... H04N 21/6131; H04N 21/44245; H04N 21/4516; H04N 21/6181; H04N 21/6405;
(Continued)

(56) References Cited

U.S. PATENT DOCUMENTS

| 4,800,426 A | 1/1989 | Glenn |
| 10,951,347 B2 | 3/2021 | Santhanam et al. |

(Continued)

FOREIGN PATENT DOCUMENTS

| CN | 107820727 A | 3/2018 |
| CN | 108029099 A | 5/2018 |

(Continued)

OTHER PUBLICATIONS

International Search Report and Written Opinion—PCT/CN2020/079836—ISA/EPO—Dec. 23, 2020; 6 pages.

(Continued)

*Primary Examiner* — Vinncelas Louis
(74) *Attorney, Agent, or Firm* — Dinsmore & Shohl LLP

(57) ABSTRACT

Various aspects include methods for supporting Enhancement for Television (ENTV) service delivery to a user equipment (UE) in a fifth generation new radio (5G-NR) radio access network (RAN). Various aspects may include generating an ENTV capability message, the ENTV capability message indicating one or more ENTV parameters of the UE, and sending the ENTV capability message to a Next Generation NodeB (gNB) of the 5G-NR RAN. Various aspects may include receiving a ENTV capability message from the UE, the ENTV capability message indicating one or more ENTV parameters of the UE, determining one or more radio resource configurations for the UE based at least in part on the one or more ENTV parameters of the UE, and generating a configuration message indicating the one or more radio resource configurations for the UE, and sending the configuration message to the UE.

29 Claims, 20 Drawing Sheets

(51) Int. Cl.
  *H04N 21/45*       (2011.01)
  *H04N 21/6405*     (2011.01)
  *H04N 21/6408*     (2011.01)
  *H04N 21/6547*     (2011.01)
  *H04W 8/22*        (2009.01)
  *H04W 72/51*       (2023.01)
  *H04W 74/00*       (2009.01)
  *H04W 76/10*       (2018.01)

(52) U.S. Cl.
  CPC ..... *H04N 21/6181* (2013.01); *H04N 21/6405* (2013.01); *H04N 21/6408* (2013.01); *H04N 21/6547* (2013.01); *H04W 8/22* (2013.01); *H04W 72/51* (2023.01); *H04W 74/004* (2013.01); *H04W 76/10* (2018.02)

(58) Field of Classification Search
  CPC ........... H04N 21/6408; H04N 21/6547; H04N 21/6582; H04W 8/22; H04W 72/51; H04W 74/004; H04W 76/10; H04W 28/18; H04W 4/06
  See application file for complete search history.

(56) References Cited

U.S. PATENT DOCUMENTS

2019/0335418 A1    10/2019  Stojanovski et al.
2020/0351639 A1*   11/2020  Shrivastava ............ H04W 4/06

FOREIGN PATENT DOCUMENTS

CN    109152049 A     1/2019
CN    109586943 A     4/2019
CN    109586973 A     4/2019
WO    2019013973 A1   1/2019

OTHER PUBLICATIONS

Huawei Technologies: "3GPP Enhancement for TV Application Support," 3GPP TSG-SA WG1 Meeting #73, S1-160053, Feb. 1-5, 2016 (Feb. 5, 2016), the whole document, 5 pages.
Gimenez J.J., et al., "5G New Radio for Terrestrial Broadcast: A Forward-Looking Approach for NR-MBMS", IEEE Transactions on Broadcasting, IEEE Service Center Piscataway, NJ, US, vol. 65. No. 2, Jun. 1, 2019, pp. 356-368. XP011727944, ISSN: 0018-9316. DOI: 10.1109/TBC.2019.2912117, Chapters II. III.
Moderator ( Qualcomm Incorporated): "Email Discussion Summary for RAN4#94e_#88_LTE_terr_bcast_Demod", R4-2002379, 3GPP, Mobile Competence Centre, 650, Route Des Lucioles, F-06921 Sophia-Antipolis Cedex, France, vol. RAN WG4, No. Electronic Meeting, Feb. 24, 2020-Mar. 6, 2020, Mar. 10, 2020, XP051863397, 16 Pages.
Nokia et al., "UE Capabilities for feMBMS", 3GPP TSG-RAN WG2 Meeting #97bis, R2-1703367, 3GPP, Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017, XP051245235, 3 Pages.
Supplementary European Search Report—EP20926161—Search Authority—The Hague—Oct. 9, 2023 11 pages.

* cited by examiner

```
BandENVT ::=         SEQUENCE {
bandENTV             FreqBandIndicatorENTV
SpectrumlocationENTV     BIT STRING(...)
...
channelSCSsENTV      CHOICE {
scs-0.37kHz               BIT STRING (...)
scs-1.25kHz               BIT STRING (...)
scs-2.5kHz                BIT STRING (...)
scs-7.5kHz                BIT STRING (...)
scs-15kHz                 BIT STRING (...)
...
BuffersizeENTV       ENUMERATED {
                          kB5000, kB6000, kB7000...
}
```

FIG. 6

METHOD TO SUPPORT ENTV BROADCAST AND UNICAST MODES IN UE

BACKGROUND

Long Term Evolution (LTE), Fifth Generation (5G) new radio (NR)(5G-NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

One service delivered in today's communication networks is Enhancement for Television (ENTV) service. ENTV is a high power and high tower (HPHT) solution developed for television broadcasters to enable the broadcast of television services according to Third Generation Partnership Project (3GPP) protocols. In some implementations of ENTV, ENTV services can be services provided via broadcast and/or unicast transmissions. In some implementations of ENTV, broadcast transmission for ENTV services may be provided to user equipments (UEs) by an ENTV radio access network (RAN)(ENTV RAN) including ENTV base stations, such as ENTV base stations operating according to the Long Term Evolution (LTE) protocol, and broadcasting ENTV services only on a downlink (DL) to UEs. In some implementations of ENTV, unicast transmission for ENTV services may be provided to UEs by a 5G-NR RAN including Next Generation NodeBs (gNBs). In some implementations of ENTV, the ENTV-RAN providing an ENTV service via broadcast may be a different network from the 5G-NR RAN providing the same ENTV service via unicast. In some implementations of ENTV, some UEs may only support unicast reception of ENTV services, some UEs may support only broadcast reception of ENTV services, and some UEs may support both broadcast and unicast reception of ENTV services. In implementations of ENTV in which broadcast and unicast ENTV modes are supported, interference between broadcast transmissions and unicast transmissions can occur, such as collision between the two modes, and co-existence issues between broadcast and unicast modes on the UEs receiving ENTV services can be experienced.

SUMMARY

Various aspects include methods for supporting Enhancement for Television (ENTV) service delivery to a user equipment (UE) in a fifth generation new radio (5G-NR) radio access network (RAN). Various aspects may reduce interference between broadcast transmissions and unicast transmissions for ENTV services. Various aspects may mitigate co-existence issues between broadcast and unicast ENTV modes on the UEs receiving ENTV services.

Various aspects may provide a method for supporting ENTV service delivery to a UE in a 5G-NR RAN. In some aspects, the method may be performed by a processor of the UE. In various aspects, the method may include generating an ENTV capability message, the ENTV capability message indicating one or more ENTV parameters of the UE, and sending the ENTV capability message to a Next Generation NodeB (gNB) of the 5G-NR RAN. In some aspects, the one or more ENTV parameters may include one or more of a supported band list for ENTV, an access spectrum location for ENTV, a subcarrier spacing for ENTV, or a buffer capability for ENTV. In some aspects, the ENTV capability message may be a radio resource control (RRC) message or a scheduling request (SR) message.

Some aspects may further include receiving a trigger message from the gNB or an ENTV base station, wherein generating the ENTV capability message may include generating the ENTV capability message in response to the trigger message.

Some aspects may further include receiving a configuration message from the gNB, and controlling one or more radio resources of the UE according to the configuration message to receive ENTV service. In some aspects, the ENTV service may be received via unicast transmissions with the gNB or via broadcast transmissions from an ENTV base station. In some aspects, controlling one or more radio resources of the UE according to the configuration message to receive ENTV service includes controlling a paging cycle of the UE according to the configuration message to receive ENTV service.

In some aspects, the method may be performed by a processor of a gNB. In various aspects, the method may include receiving a ENTV capability message from the UE, the ENTV capability message indicating one or more ENTV parameters of the UE, determining one or more radio resource configurations for the UE based at least in part on the one or more ENTV parameters of the UE, generating a configuration message indicating the one or more radio resource configurations for the UE, and sending the configuration message to the UE.

Some aspects may further include sending the ENTV capability message to an ENTV base station.

Some aspects may further include receiving ENTV configuration parameters from the ENTV base station, wherein determining the one or more radio resource configurations for the UE based at least in part on the one or more ENTV parameters of the UE includes determining the one or more radio resource configurations for the UE based at least in part on the one or more ENTV parameters and the ENTV configuration parameters from the ENTV base station. In some aspects, the ENTV configuration parameters from the ENTV base station include ENTV paging cycle information. In some aspects, the ENTV capability message may be a radio resource control (RRC) message or a scheduling request (SR) message.

Some aspects may further include, prior to receiving the ENTV capability message from the UE, generating a trigger message for the UE configured to cause the UE to send the ENTV capability message, and sending the trigger message to the UE. In some aspects, the trigger message may be a radio resource control (RRC) message.

In some aspects, the one or more ENTV parameters may include a buffer capability for ENTV. In some aspects, the one or more ENTV parameters may include a supported band list for ENTV. Some aspects may further include determining whether ENTV transmissions and 5G-NR transmissions are deployed in a same band based at least in part on the supported band list for ENTV, and scheduling a cell center for 5G-NR transmissions based at least in part on a frequency domain used by ENTV UEs to reduce throughput loss due to UE-to-UE interference or in-device interference in response to determining that ENTV transmissions and 5G-NR transmissions are deployed in the same band, wherein the scheduled cell center may be at least one of the one or more radio resource configurations for the UE. In some aspects, the one or more ENTV parameters may include a subcarrier spacing for ENTV. Some aspects may further include determining a paging cycle of the UE to avoid paging collision between ENTV and 5G-NR based at least in part on the subcarrier spacing for ENTV, wherein the determined paging cycle may be at least one of the one or more radio resource configurations for the UE. In some aspects, the one or more ENTV parameters may include an access spectrum location for ENTV. Some aspects may further include determining whether ENTV transmissions and 5G-NR transmissions are deployed in adjacent spectrum, and scheduling, in response to determining that ENTV transmissions and 5G-NR transmissions are deployed in adjacent spectrum, 5G-NR downlink (DL) transmissions in a sub-band of a 5G-NR DL band separated from an ENTV DL band by a 5G-NR guard band of the 5G-NR DL band or an ENTV guard band of the ENTV DL band or 5G-NR uplink (UL) transmissions in a sub-band of a 5G-NR UL band separated from the ENTV DL band by a 5G-NR guard band of the 5G-NR UL band or a ENTV guard band of the ENTV DL band.

In some aspects, the ENTV capability message includes ENTV paging cycle information. Some aspects may further include receiving an ENTV service announcement (SA) from an ENTV base station, and sending the ENTV SA to the UE.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 6 is schema of an example ENTV capability message in accordance with various embodiments.

DETAILED DESCRIPTION

Figure 1A:
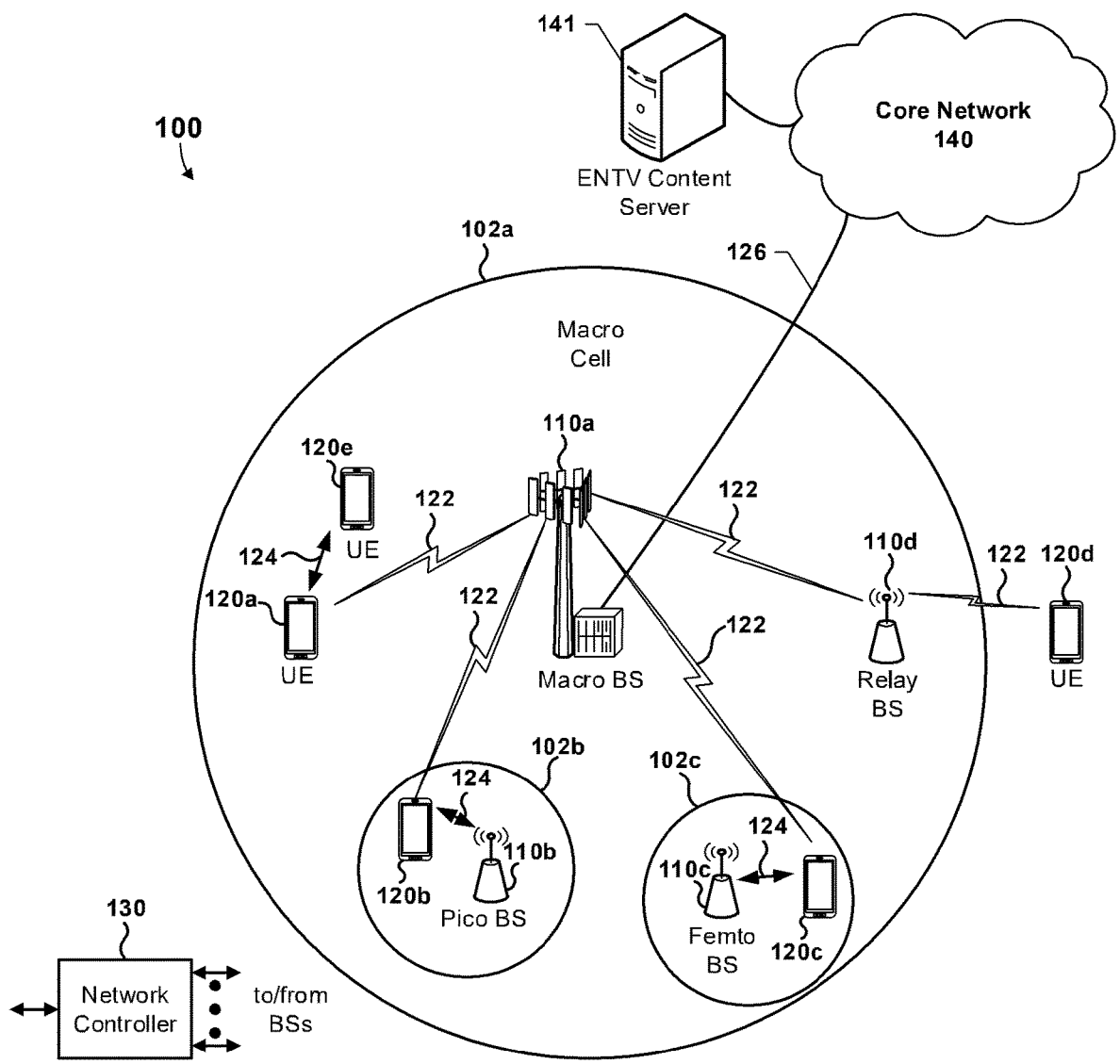
FIG. 1A is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide user equipment and/or base station (e.g., gNB) implemented methods for supporting ENTV service delivery to a UE in a 5G-NR RAN. Various embodiments may include generating an ENTV capability message, the ENTV capability message indicating one or more ENTV parameters of the UE, and sending the ENTV capability message to a Next Generation NodeB (gNB) of the 5G-NR RAN. Various embodiments may include receiving a ENTV capability message from the UE, the ENTV capability message indicating one or more ENTV parameters of the UE, determining one or more radio resource configurations for the UE based at least in part on the one or more ENTV parameters of the UE, generating a configuration message indicating the one or more radio resource configurations for the UE, and sending the configuration message to the UE. Various aspects may reduce interference between broadcast transmissions and unicast transmissions for ENTV services. Various aspects may mitigate co-existence issues between broadcast and unicast ENTV modes on the UEs receiving ENTV services.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

ENTV is a high power and high tower (HPHT) solution developed for television broadcasters to enable the broadcast of television services according to 3GPP protocols. ENTV base stations may have greater than or equal to 1 kw transmit (Tx) power which may be greater than or equal to 10 db higher than macro base stations of 5G-NR RANs, such as gNBs. As such, ENTV RANs can provide coverage of a geographic area with only a few base stations in comparison to the number of base stations required for 5G-NR coverage of the same geographic area. As there may be two types of base stations covering a geographic area, e.g., the ENTV base stations and gNBs, ENTV broadcast may be deployed on a first RAN (e.g., an ENTV RAN) and ENTV unicast may be deployed on a second different RAN (e.g., a 5G-NR RAN). Some UEs may only support unicast reception of ENTV services. These unicast only UEs may be referred to as Type 1 UEs. Some UEs may support only broadcast reception of ENTV services. These broadcast-only UEs may be referred to as Type 2 UEs. Some UEs may support both broadcast and unicast reception of ENTV services. The dual broadcast and unicast UEs may be referred to as Type 3 UEs. In some implementations of ENTV, ENTV broadcast transmissions may be in the same frequency band as ENTV unicast transmissions. For example, the same ENTV broadcaster (e.g., a television broadcast company) may own both the ENTV broadcast license (e.g., a license to use LTE designated spectrum for broadcast transmission of ENTV services) and the ENTV unicast license (e.g., a license to use NR designated spectrum for unicast transmission of ENTV services).

In scenarios in which a UE supports both ENTV broadcast and unicast, the UE may need to switch between ENTV broadcast and unicast mode with appropriate paging cycle to make sure there is no collision between the two modes. However, current broadcast and unicast networks (e.g., current 5G-NR RANs and current ENTV RANS) are not aware of the UE types operating in their coverage areas (e.g., Type 1 UEs, Type 2 UEs, or Type 3 UEs). Additionally, there is no current mechanism for reporting UE parameters for supporting ENTV to current 5G-NR RANs, such as supporting band, subscribe carrier spacing (SCS), and paging period. Additionally, current networks do not support capability reporting from ENTV UEs (e.g., UEs capable of receiving ENTV services, such as Type 1, Type 2, and/or Type 3 UEs) and signaling switching procedures between ENTV base stations and unicast base stations (e.g., gNBs). Further, in scenarios where a UE which supports unicast and broadcast modes (e.g., a Type 3 UE) and the unicast and broadcast transmissions are in the same frequency band, current system provide no mechanism to avoid co-existence issues. The interference between the unicast and broadcast transmissions in the same frequency band in current systems is related to the ENTV system bandwidth used for ENTV DL transmissions.

Various embodiments may enable supporting ENTV service delivery to UE in 5G-NR RAN to reduce interference between broadcast transmissions and unicast transmissions for ENTV services. Various embodiments may enable supporting ENTV service delivery to UE in 5G-NR RAN to mitigate co-existence issues between broadcast and unicast ENTV modes on UEs receiving ENTV services.

In various embodiments, as there is no uplink (UL) for ENTV broadcast modes, a UE may report ENTV broadcast related parameters to the unicast base station (e.g., a gNB). In various embodiments, a UE may generate and send an ENTV capability message to the gNB providing the unicast ENTV transmission. The ENTV capability message may indicate one or more ENTV parameters of the UE. In various embodiments, the one or more ENTV parameters comprise one or more of a supported band list for ENTV, an access spectrum location for ENTV, a subcarrier spacing for ENTV, or a buffer capability for ENTV. In various embodiments, the ENTV capability message may be a radio resource control (RRC) message.

In various embodiments, there may be an interface established between an ENTV base station and a gNB. For example, the ENTV base station may communicate over a communication link established between the ENTV base station and gNB directly and/or through their respective core networks. In various embodiments, the unicast network may deliver singling from the UE, such as the ENTV capability message, to the ENTV BS through such an interface. In various embodiments, the ENTV BS and the gNB may coordinate to configure the UE in both broadcast and unicast modes. In various embodiments, if there is no interface between the ENTV base station and the gNB, then gNB may configure the UE in unicast mode and/or the UE may report the ENTV paging configuration an ENTV capability message, such as via a scheduling request (SR) procedure to the gNB. Based on the ENTV capability message (e.g., a SR message), the unicast base station (e.g., the gNB) may configure the measurement gap to avoid the UE missing ENTV paging. In various embodiments, the gNB may send a configuration message to the UE to control one or more radio resources of the UE to receive ENTV service. For example, the configuration message may indicate a paging cycle for the UE.

In various embodiments, ENTV capability reporting by a UE may include sending an ENTV capability message. The ENTV capability message may indicate one or more ENTV parameters including one or more of a supported band list for ENTV, an access spectrum location for ENTV, a subcarrier spacing for ENTV, or a buffer capability for ENTV. For example, the ENTV parameters may be include as additional information elements in an RRC message sent by the UE to a gNB. The additional information elements may enable ENTV capability reporting. At least the following ENTV related information elements may be reported by UE, supported band list for ENTV, supported access spectrum location for ENTV, subcarrier spacing for ENTV, and buffer size for broadcasting reception.

In various embodiments, the reported ENTV parameters may enable the gNB and the ENTV base station to provision ENTV services via broadcast and/or unicast to the UE so as to reduce interference between broadcast transmissions and unicast transmissions for ENTV services and/or mitigate co-existence issues between broadcast and unicast ENTV modes on UEs receiving ENTV services. For example, with the capability information indicated by the supported band list for ENTV, a gNB may classify UEs as two types of UEs, either Type 1 UEs that can support only NR unicast reception of ENTV service or Type 3 UEs that can support both ENTV broadcast delivery of ENTV service and NR unicast delivery of ENTV service. In addition, the ENTV band may be determined from the supported band list. For example, with the capability information on subcarrier spacing (SCS) and bandwidth, the gNB may derive the frame length for ENTV services.

Based on the SCS, the gNB may configure Type 3 UEs as the normal NR UEs. Based on the SCS, the gNB may configure Type 1 UEs to coordinate the paging cycle for ENTV broadcast and NR unicast to ensure that paging collision between ENTV broadcast and ENTV unicast can be avoided. For example, with the capability information on buffer size, the amount of data provided to the UE via broadcast ENTV transmissions or unicast ENTV transmissions can be controlled. For example, a higher buffer size can indicate the UE can buffer more data. For example, with the capability information, the gNB may determine whether ENTV broadcast and NR unicast of ENTV services are deployed in the same band. When the unicast and broadcast ENTV services are deployed in the same band there will be co-existence at the adjacent spectrum.

The gNB may schedule a cell center for the NR UE to reduce the throughput loss based on the bandwidth of ENTV indicated by the band list. For example, with the capability information on access spectrum location for ENTV, the gNB may adjust the scheduling of UL and/or DL transmissions for NR to increase the guard band between ENTV broadcast and NR UL and/or DL. As a specific example, when there are multiple filters, e.g. 2 filters, to cover the whole ENTV broadcast and NR unicast assigned spectrum, ENTV broadcast and NR unicast may be deployed in adjacent spectrum.

As such, there may be interference from NR UL to ENTV DL in a UE device when ENTV and unicast are working simultaneously (e.g., in a Type 3 UE). To prevent such in-device interference, the ENTV UE may report the access spectrum location (e.g., access through Filter 2 (upper ENTV spectrum)) to the gNB. With this information on the access spectrum location (e.g., Filter 2), the gNB can schedule the NR DL in Duplexer 2 (NR upper spectrum) to increase the guard band between the ENTV broadcast mode and the ENTV unicast mode (i.e., the NR bands). The similar method may be applied for lower spectrum (e.g., when the UE uses Filter 1). This scheduling shift may also be used to reduce UE-UE co-existence interference (e.g., interference between Type 1 UEs and Type 2 UEs).

In some embodiments, a gNB may trigger the UE to deliver the ENTV configuration information (e.g., paging cycle of ENTV) to the gNB. Then a Type 3 UE may check the paging parameters to avoid missing ENTV paging information. In various embodiments, a gNB may generate a trigger message for the UE configured to cause the UE to send the ENTV capability message.

In some embodiments, an ENTV BS may deliver a service announcement (SA) to a gNB, to thereby trigger the gNB to send the SA to a UE to reduce switching between unicast and ENTV broadcast modes at the UE. In such embodiments, paging information may not be necessary.

In some embodiments, information about ENTV configurations may not be delivered to a gNB and the ENTV base station may be configured to default settings. In some embodiments, the UE receives the ENTV paging cycle configuration, and reports the ENTV paging cycle to the unicast base station (e.g., the gNB) via a SR procedure. With this reported ENTV paging cycle, a gNB may configure the measurement gap used when a UE camps on the unicast network.

FIG. 1A illustrates an example of a communications system 100 that is suitable for implementing various embodiments. The communications system 100 may be an 5G NR network, an ENTV network, or any other suitable network such as an LTE network.

The communications system 100 may include a heterogeneous network architecture that includes a core network 140 and a variety of mobile devices (also referred to as user equipment (UE) computing devices or simply UEs) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), an ENTV base station, or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", "ENTV base station", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/ Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an access terminal, a UE, a terminal, a mobile station, a subscriber unit, a station, etc.

A macro base station 110a may communicate with the core network 140 over a wired or wireless communication link 126. The wireless devices 120a, 120b, 120c may communicate with a base station 110a-110d over a wireless communication link 122. The core network 140 may be connected to other devices, such as ENTV content server 141. In this manner, via the connections to the core network 140, the ENTV content server 141 may make ENTV services, such as television content, available to wireless devices 120a, 120b, 120c (e.g., from the core network 140 via the link 126 and from the base stations 110a-110d via the link 122).

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a subcarrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

While descriptions of some embodiments may use terminology and examples associated with LTE technologies, various embodiments may be applicable to other wireless communications systems, such as ENTV networks. ENTV is a high power and high tower (HPHT) solution developed for television broadcasters to enable the broadcast of television services according to Third Generation Partnership Project (3GPP) protocols. In ENTV networks, an ENTV base stations, such as a macro base station 110a, may have a transmit power greater than or equal to 1 kw, which may be greater than 10 dB higher than the transmit power of gNBs for example. As such, an ENTV network may provide full coverage with only a few base stations. In some ENTV networks, the ENTV networks may be configured as broadcast only type networks in which the ENTV base stations, such as macro base station 110a, only transmit on the DL.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 1B:
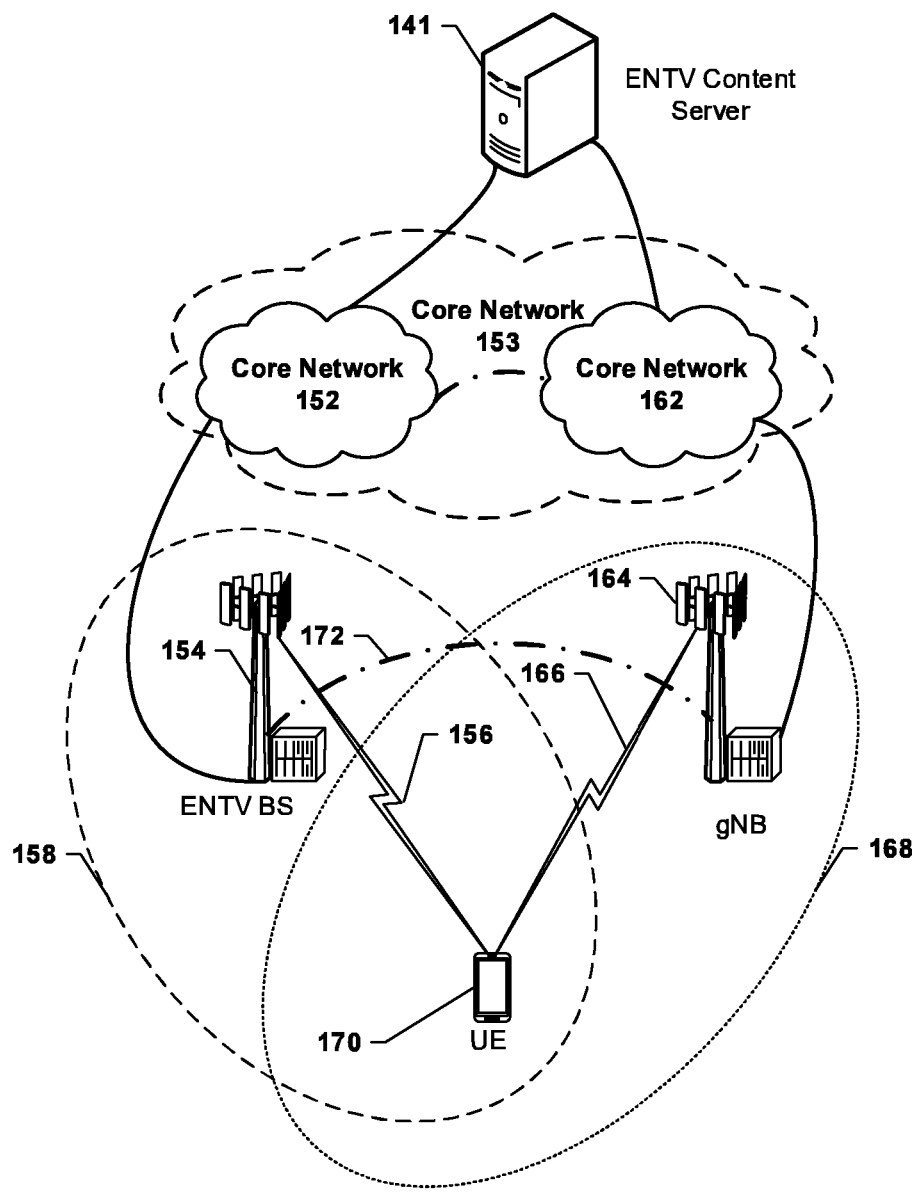
FIG. 1B is a system block diagram conceptually illustrating an example ENTV RAN and a 5G-NR RAN providing ENTV services to a UE.

FIG. 1B is a system block diagram conceptually illustrating an example ENTV RAN and a 5G-NR RAN providing ENTV services to a UE 170 (e.g., UEs 120a-e). With reference to FIGS. 1A and 1B, the ENTV RAN and 5G-NR RAN may each be configured in similar manners as the communications system 100 of FIG. 1A. The ENTV RAN may be configured to provide broadcast ENTV services to UEs, such as UE 170, in an ENTV coverage area 158. The 5G-NR RAN may be configured to provide unicast ENTV services to UEs, such as UE 170, in a 5G-NR RAN coverage area 168. The ENTV coverage area 158 and the 5G-NR RAN coverage area 168 may overlap such that when the UE 170 is at a location where the ENTV coverage area 158 and the 5G-NR RAN coverage area 168, the UE 170 may receive broadcast ENTV services via broadcast transmissions 156 from a ENTV base station 154 (e.g., a base station 110a-d) and unicast ENTV services via unicast transmissions 166 from a gNB 164 (e.g., a base station 110a-d). In some instances, the broadcast transmissions 156 and the unicast transmissions 166 may be in the same frequency bands. Each of the ENTV base station 154 and the gNB 164 may be connected to its own respective core network 152, 162 (e.g., core network 140). Alternatively, the same core network 153 may control the ENTV base station 154 and the gNB 164 (e.g., core networks 152 and 162 may be part of the same core network 153).

In some optional embodiments, the ENTV base station 154 and the gNB 164 may be connected by a communication link 172 and may exchange information with one another via the communication link 172. In some optional embodiments, the core networks 152 and 162 may be connected to one another and the ENTV base station 154 and the gNB 164 may share information with one another via their respective connections to their core networks 152, 162 and the connections between the core networks 152, 162. Similarly, in some embodiments, the core networks 152, 162 may be the same core network 153 and the ENTV base station 154 and the gNB 164 may share information with one another via that same core network 153.

An ENTV content server 141 may be connected to the core networks 152, 153, 162, and may provide ENTV services (e.g., television content) for provisioning to the UE 170 in the ENTV coverage area 158 and the 5G-NR RAN coverage area 168. The same ENTV services (e.g., the same television content) may be made available to the UE 170 via broadcast transmissions 156 from the ENTV base station 154 and the unicast transmissions 166 from the gNB 166. The UE 170 may be any type of UE, such as a UE that may only support unicast reception of ENTV services, a UE that may support only broadcast reception of ENTV services, or a UE that may support both broadcast and unicast reception of ENTV services.

Figure 2:
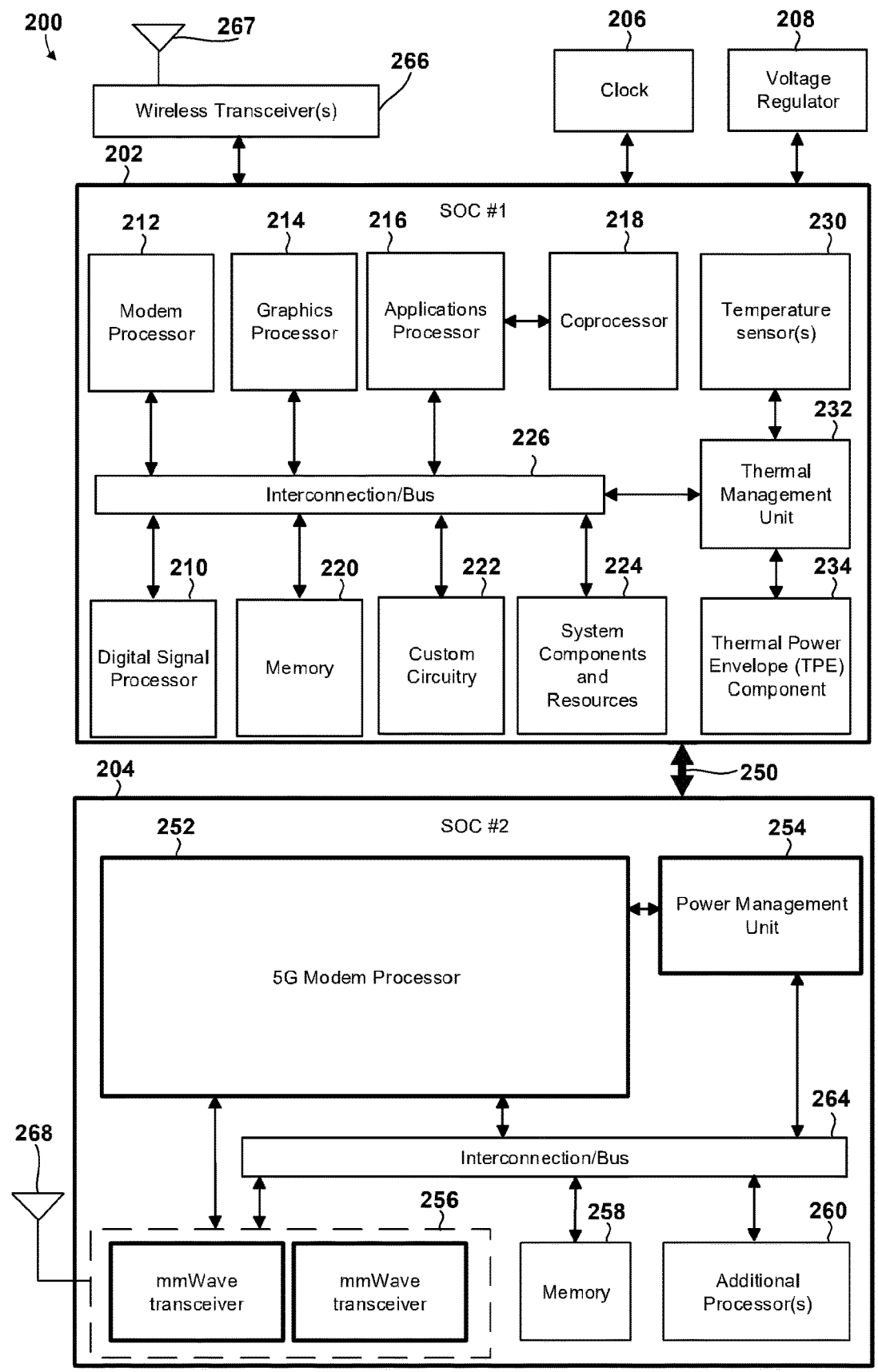
FIG. 2 is a component block diagram illustrating a computing system that may be configured to implement ENTV service delivery in accordance with various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP.

With reference to FIGS. 1A, 1B, and 2, the illustrated example computing system 200 (which may be a SIP in some embodiments) that includes a two SOCs 202, 204 coupled to a clock 206, a voltage regulator 208, and one or more wireless transceivers 266 configured to send and receive wireless communications via one or more antennas 267 to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc. The plurality of mmWave transceivers 256 may be connected to one or more antennas 268 and may be configured to send and receive wireless communications via the one or more antennas 268 to/from wireless devices, such as a base station 110a. The plurality of mmWave transceivers 256, one or more antennas 268, one or more wireless transceivers 266, and/or one or more antennas 267, individually and/or in combination with other components of the system 200, may be radio resources that may be controlled by the first SOC 202 and/or the second SOC 204 to send and receive wireless communications, such as unicast and/or broadcast communications (e.g., unicast and/or broadcast ENTV transmissions).

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
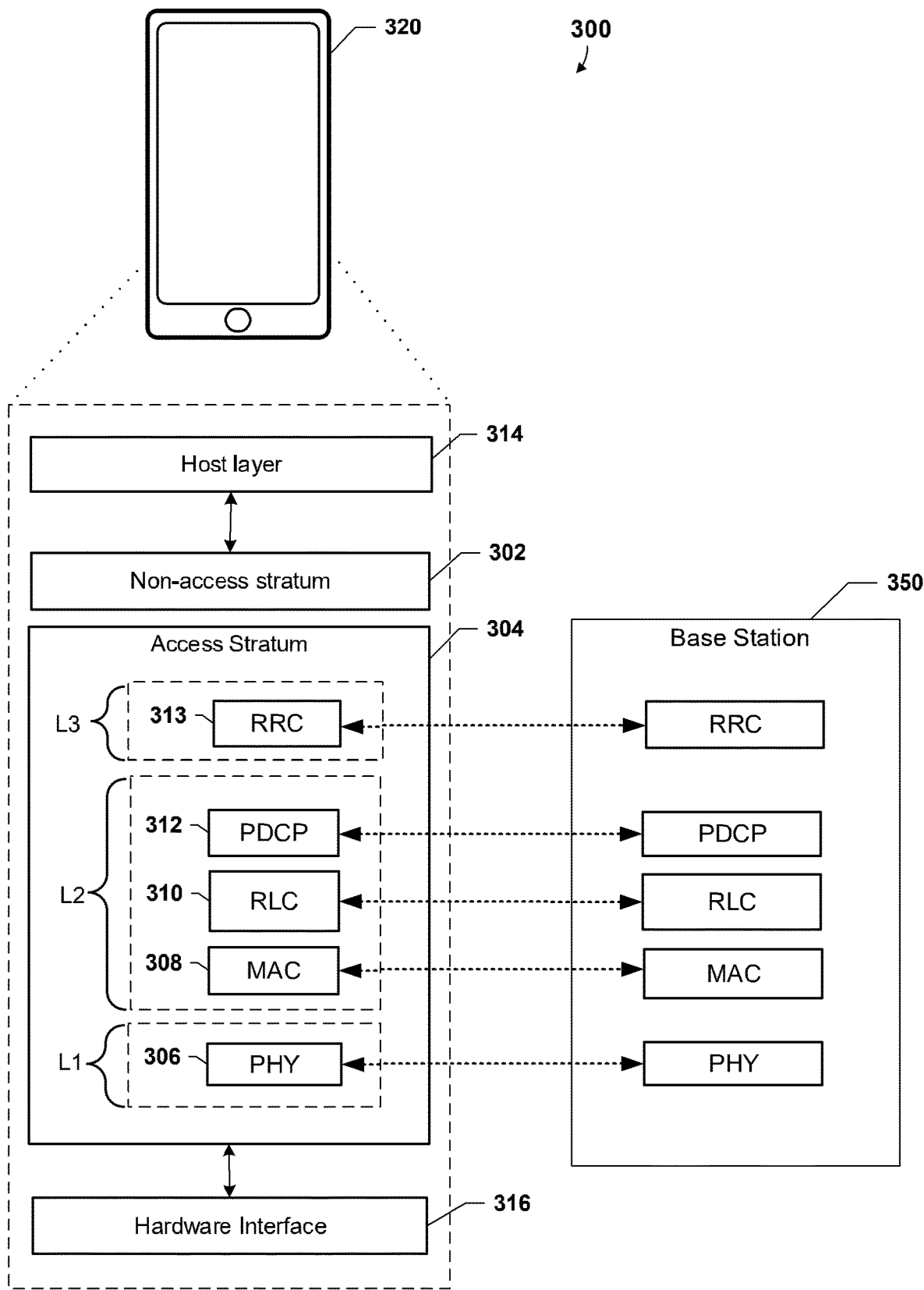
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a, 154, 164) and a wireless device (UE computing device) 320 (e.g., the wireless device 120a-120e, UE 170, SIP 200). With reference to FIGS. 1A-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
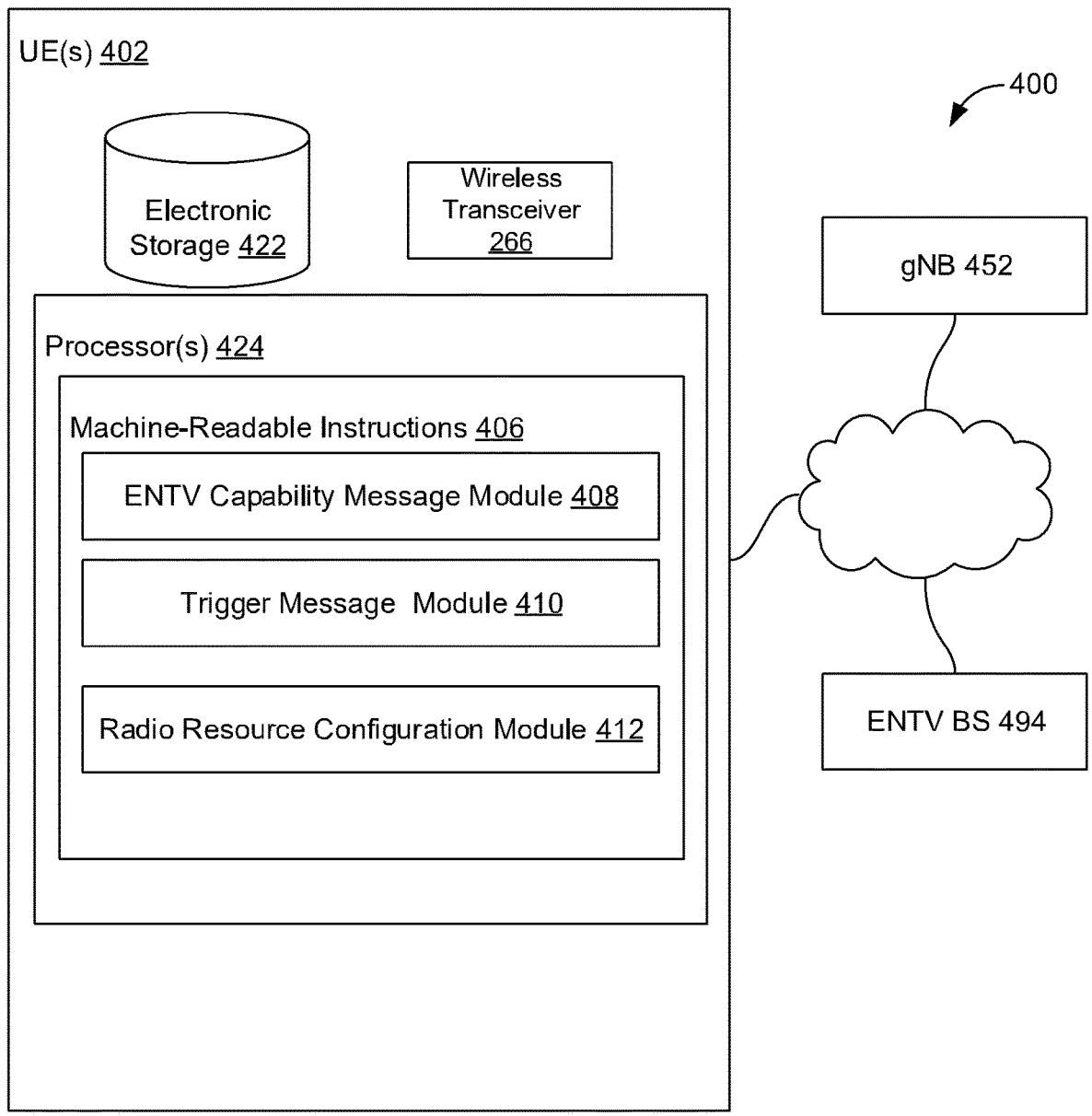
FIGS. 4A and 4B are component block diagrams illustrating a system configured for supporting ENTV service delivery to a UE in a 5G-NR RAN.
Figure 4B:
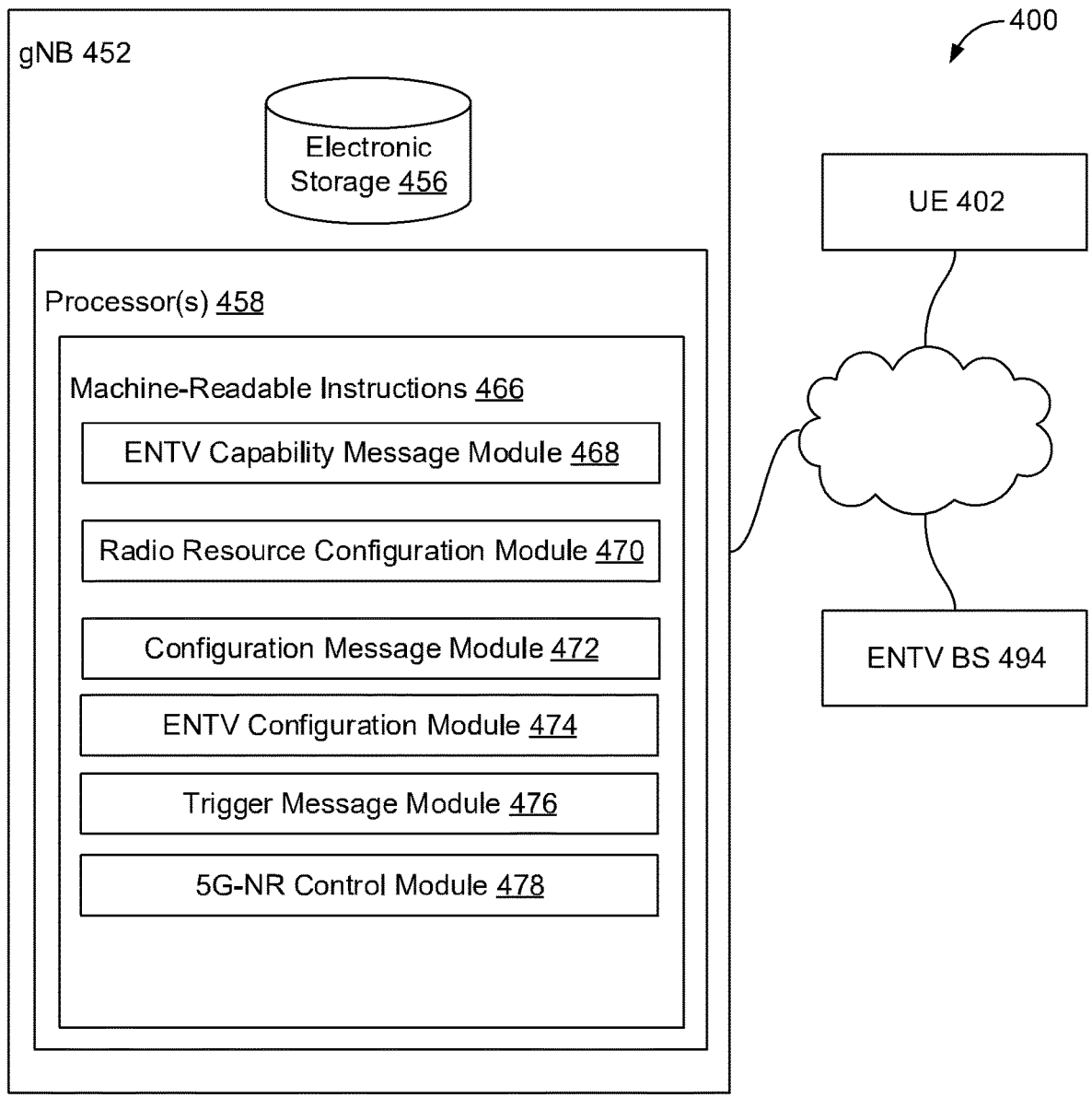

FIGS. 4A and 4B are component block diagrams illustrating a system 400 configured for supporting ENTV service delivery to a UE in a 5G-NR RAN in accordance with various embodiments. In some embodiments, system 400 may include one or more UEs 402 (e.g., UE 120a-120e, UE 170, SIP 200, UE 320), one or more gNB 452 (e.g., the base station 110a, 164, 350) and/or one or more ENTV base stations 494 (e.g., the base station 110a, 154, 350).

With reference to FIGS. 1A-4B, UE(s) 402 may be configured by machine-readable instructions 406. Machine-readable instructions 406 may include one or more instruction modules. The instruction modules may include computer program modules. The instruction modules may include one or more of ENTV capability message module 408, trigger message module 410, radio resource configuration module 412, and/or other instruction modules.

The ENTV capability message module 408 may be configured to generate an ENTV capability message, the ENTV capability message indicating one or more ENTV parameters of the UE. The ENTV capability message module 408 may be configured such that the one or more ENTV parameters comprise one or more of a supported band list for ENTV, an access spectrum location for ENTV, a subcarrier spacing for ENTV, or a buffer capability for ENTV. The ENTV capability message module 408 may be configured to send the ENTV capability message to a gNB of the 5G-NR RAN. The ENTV capability message module 408 may be configured such that the ENTV capability message may be an RRC message or a SR message. The ENTV capability message module 408 may be configured to generating the ENTV capability message in response to the trigger message.

The trigger message module 410 may be configured to receive a trigger message from the gNB or an ENTV base station.

The radio resource configuration module 412 may be configured to receive a configuration message from the gNB. The radio resource configuration module 412 may be configured to control one or more radio resources of the UE according to the configuration message to receive ENTV service. The radio resource configuration module 412 may be configured such that the ENTV service is received via unicast transmissions with the gNB or via broadcast transmissions from an ENTV base station. The radio resource configuration module 412 may be configured to control a paging cycle of the UE according to the configuration message to receive ENTV service.

The gNB(s) 452 may be configured by machine-readable instructions 466. Machine-readable instructions 466 may include one or more instruction modules. The instruction modules may include computer program modules. The instruction modules may include one or more of ENTV capability message module 468, radio resource configuration module 470, configuration message module 472, ENTV configuration module 474, trigger message module 476, 5G-NR control module 478, and/or other instruction modules.

The ENTV capability message module 468 may be configured to receive an ENTV capability message from the UE, the ENTV capability message indicating one or more ENTV parameters of the UE. The ENTV capability message module 468 may be configured such that the ENTV capability message is an RRC message or a scheduling request SR message. The ENTV capability message module 468 may be configured such that the one or more ENTV parameters comprise a buffer capability for ENTV. The ENTV capability message module 468 may be configured such that the one or more ENTV parameters comprise a supported band list for ENTV. The ENTV capability message module 468 may be configured such that the one or more ENTV parameters comprise a subcarrier spacing for ENTV. The ENTV capability message module 468 may be configured such that the one or more ENTV parameters comprise an access spectrum location for ENTV. The ENTV capability message module 468 may be configured such that the ENTV capability message includes ENTV paging cycle information.

The radio resource configuration module 470 may be configured to determine one or more radio resource configurations for the UE based at least in part on the one or more ENTV parameters of the UE. The radio resource configuration module 470 may be configured to determine the one or more radio resource configurations for the UE based at least in part on the one or more ENTV parameters and the ENTV configuration parameters from the ENTV base station.

The configuration message module 472 may be configured to generate a configuration message indicating the one or more radio resource configurations for the UE. The configuration message module 472 may be configured to send the configuration message to the UE. The configuration message module 472 may be configured to send the ENTV capability message to an ENTV base station.

The ENTV configuration module 474 may be configured to receive ENTV configuration parameters from the ENTV base station. The ENTV configuration module 474 may be configured to receive an ENTV service announcement (SA) from an ENTV base station. The ENTV configuration module 474 may be configured to send the ENTV SA to the UE.

The trigger message module 476 may be configured to generate a trigger message for the UE configured to cause the UE to send the ENTV capability message. The trigger message module 476 may be configured such that the trigger message may be generated prior to receiving the ENTV capability message. The trigger message module 476 may be configured to send the trigger message to the UE. The trigger message module 476 may be configured such that the trigger message is RRC message.

The 5G-NR control module 478 may be configured to determine whether ENTV transmissions and 5G-NR transmissions are deployed in a same band based at least in part on the supported band list for ENTV. In response to determining that ENTV transmissions and 5G-NR transmissions are deployed in the same band, the 5G-NR control module 478 may be configured to schedule a cell center for 5G-NR transmissions based at least in part on a frequency domain used by ENTV broadcast-only-UEs (i.e., UEs that only receive ENTV broadcast) to reduce throughput loss due to UE-to-UE interference or in-device interference. The 5G-NR control module 478 may be configured such that the scheduled cell center is at least one of the one or more radio resource configurations for the UE. The 5G-NR control module 478 may be configured to determine a paging cycle of the UE to avoid paging collision between ENTV and 5G-NR based at least in part on the subcarrier spacing for ENTV. The 5G-NR control module 478 may be configured such that the determined paging cycle is at least one of the one or more radio resource configurations for the UE. The 5G-NR control module 478 may be configured to determine whether ENTV transmissions and 5G-NR transmissions are deployed in adjacent spectrum. In response to determining that ENTV transmissions and 5G-NR transmissions are deployed in adjacent spectrum, the 5G-NR control module 478 may be configured to schedule 5G-NR DL transmissions in a sub-band of a 5G-NR DL band separated from an ENTV DL band by a 5G-NR guard band of the 5G-NR DL band or an ENTV guard band of the ENTV DL band. In response to determining that ENTV transmissions and 5G-NR transmissions are deployed in adjacent spectrum, the 5G-NR control module 478 may be configured to schedule 5G-NR uplink UL transmissions in a sub-band of a 5G-NR UL band separated from the ENTV DL band by a 5G-NR guard band of the 5G-NR UL band or ENTV guard band of the ENTV DL band.

In some implementations, UE(s) 402, gNB(s) 452, and/or ENTV base stations 494 may be operatively linked via communication links, such as wireless communication links.

UE(s) 402 may include electronic storage 422, one or more processors 424 coupled to a wireless transceiver 266, and/or other components. UE(s) 402 may include communication lines, or ports to enable the exchange of information with a network and/or other computing platforms. Illustration of UE(s) 402 in FIG. 4A is not intended to be limiting. gNB(s) 452 may include electronic storage 452, one or more processors 458, and/or other components. gNB(s) 452 may include communication lines, or ports to enable the exchange of information with a network and/or other computing platforms. Illustration of gNB(s) 452 in FIG. 4B is not intended to be limiting.

Electronic storage 422, 456 may include non-transitory storage media that electronically stores information. The electronic storage media of electronic storage 422, 456 may include one or both of system storage that is provided integrally (i.e., substantially non-removable) with UE(s) 402 and gNB(s) 452 and/or removable storage that is removably connectable to UE(s) 402 and gNB(s) 452 via, for example, a port (e.g., a universal serial bus (USB) port, a firewire port, etc.) or a drive (e.g., a disk drive, etc.). Electronic storage 422, 456 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 422, 456 may include one or more virtual storage resources (e.g., cloud storage, a virtual private network, and/or other virtual storage resources). Electronic storage 422, 456 may store software algorithms, information determined by processor(s) 424, 458, information received from UE(s) 402, information received from gNB(s) 452, information received from ENTV base station(s) 494, and/or other information that enables UE(s) 402 and gNB(s) 452 to function as described herein.

Processor(s) 424, 428 may be configured to provide information processing capabilities in UE(s) 402 and gNB(s) 452. As such, processor(s) 424, 428 may include one or more of a digital processor, an analog processor, a digital circuit designed to process information, an analog circuit designed to process information, a state machine, and/or other mechanisms for electronically processing information. Although processor(s) 424, 428 are shown in FIGS. 4A and 4B as single entities, this is for illustrative purposes only. In some implementations, processor(s) 424, 428 may include a plurality of processing units. These processing units may be physically located within the same device, or processor(s) 424, 428 may represent processing functionality of a plurality of devices operating in coordination. Processor(s) 424, 428 may be configured to execute modules 408, 410, 412, 468, 470, 472, 474, 476, and/or 478, and/or other modules. Processor(s) 424, 428 may be configured to execute modules 408, 410, 412, 468, 470, 472, 474, 476, and/or 478, and/or other modules by software; hardware; firmware; some combination of software, hardware, and/or firmware; and/or other mechanisms for configuring processing capabilities on processor(s) 424, 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 468, 470, 472, 474, 476, and/or 478 are illustrated in FIGS. 4A and 4B as being implemented within a single processing unit, in implementations in which processor(s) 424, 428 includes multiple processing units, one or more of modules 408, 410, 412, 468, 470, 472, 474, 476, and/or 478 may be implemented remotely from the other modules. The description of the functionality provided by the different modules 408, 410, 412, 468, 470, 472, 474, 476, and/or 478 described below is for illustrative purposes, and is not intended to be limiting, as any of modules 408, 410, 412, 468, 470, 472, 474, 476, and/or 478 may provide more or less functionality than is described. For example, one or more of modules 408, 410, 412, 468, 470, 472, 474, 476, and/or 478 may be eliminated, and some or all of its functionality may be provided by other ones of modules 408, 410, 412, 468, 470, 472, 474, 476, and/or 478. As another example, processor(s) 424, 428 may be configured to execute one or more additional modules that may perform some or all of the functionality attributed below to one of modules 408, 410, 412, 468, 470, 472, 474, 476, and/or 478.

Figure 5A:
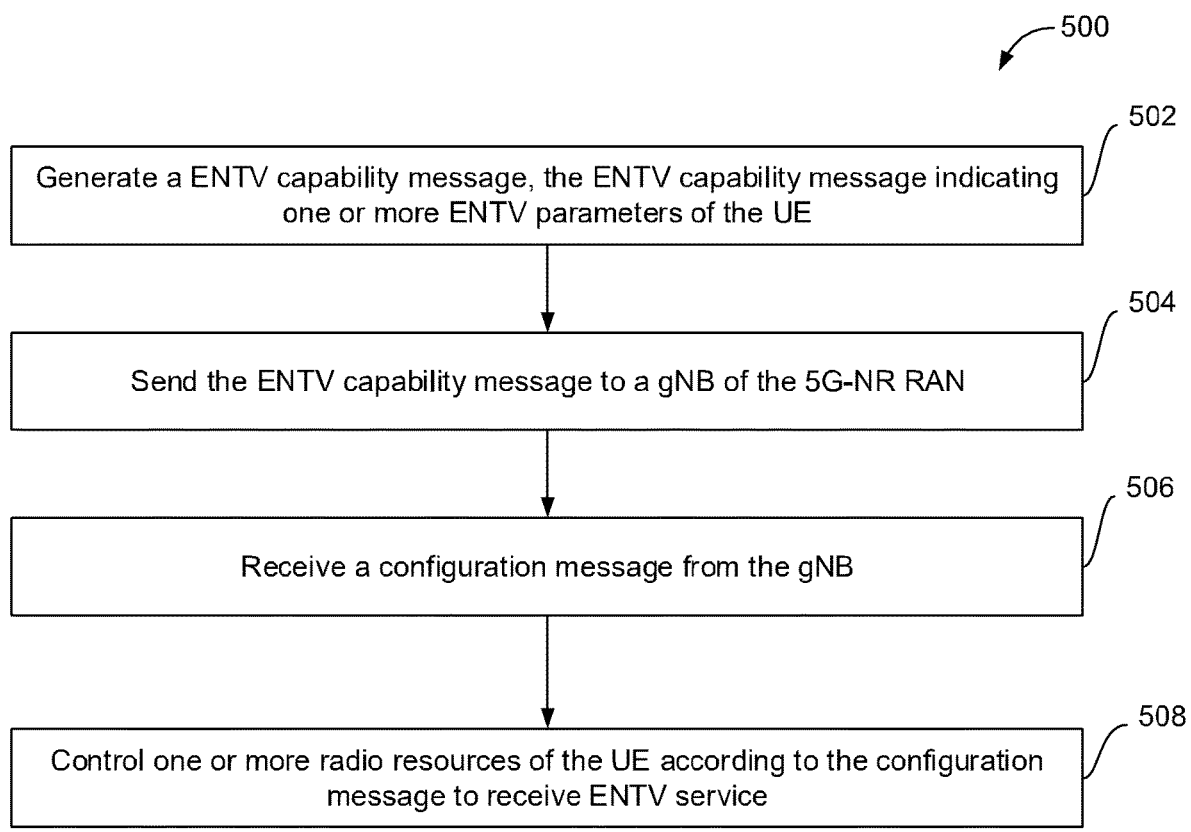
FIG. 5A is a process flow diagram illustrating a method for supporting ENTV service delivery to a UE in a 5G-NR RAN in accordance with various embodiments.

FIG. 5A shows a process flow diagram of an example method 500 for supporting ENTV service delivery to a UE in a 5G-NR RAN according to various embodiments. With reference to FIGS. 1A-5A, the method 500 may be implemented by a processor of a UE s 402 (e.g., UE 120a-120e, UE 170, SIP 200, UE 320, UE 402), one or more gNB 452 (e.g., the base station 110a, 164, 350) and/or one or more ENTV base stations 494 (e.g., the base station 110a, 154, 350).

In block 502, the processor may perform operations including generating an ENTV capability message, the ENTV capability message indicating one or more ENTV parameters of the UE. In various embodiments, the one or more ENTV parameters may be one or more of a supported band list for ENTV, an access spectrum location for ENTV, a subcarrier spacing for ENTV, or a buffer capability for ENTV. In various embodiments, the ENTV capability message may be an RRC message or a SR message.

In block 504, the processor may perform operations including sending the ENTV capability message to a gNB of the 5G-NR RAN.

In block 506, the processor may perform operations including receiving a configuration message from the gNB. In various embodiments, an ENTV BS and the gNB may coordinate to configure the UE in both broadcast and unicast modes, and the configurations may be indicating in the received configuration message from the gNB. Based on the ENTV capability message (e.g., an SR message), the unicast base station (e.g., the gNB) may configure the measurement gap to avoid the UE missing ENTV paging. In various embodiments, the gNB may send a configuration message to the UE to control one or more radio resources of the UE to receive ENTV service. For example, the configuration message may indicate a paging cycle for the UE.

In block 508, the processor may perform operations including controlling one or more radio resources of the UE according to the configuration message to receive ENTV service. In various embodiments, the ENTV service may be received via unicast transmissions with the gNB or via broadcast transmissions from an ENTV base station. In various embodiments, controlling one or more radio resources of the UE according to the configuration message to receive ENTV service may include controlling a paging cycle of the UE according to the configuration message to receive ENTV service.

Figure 5B:
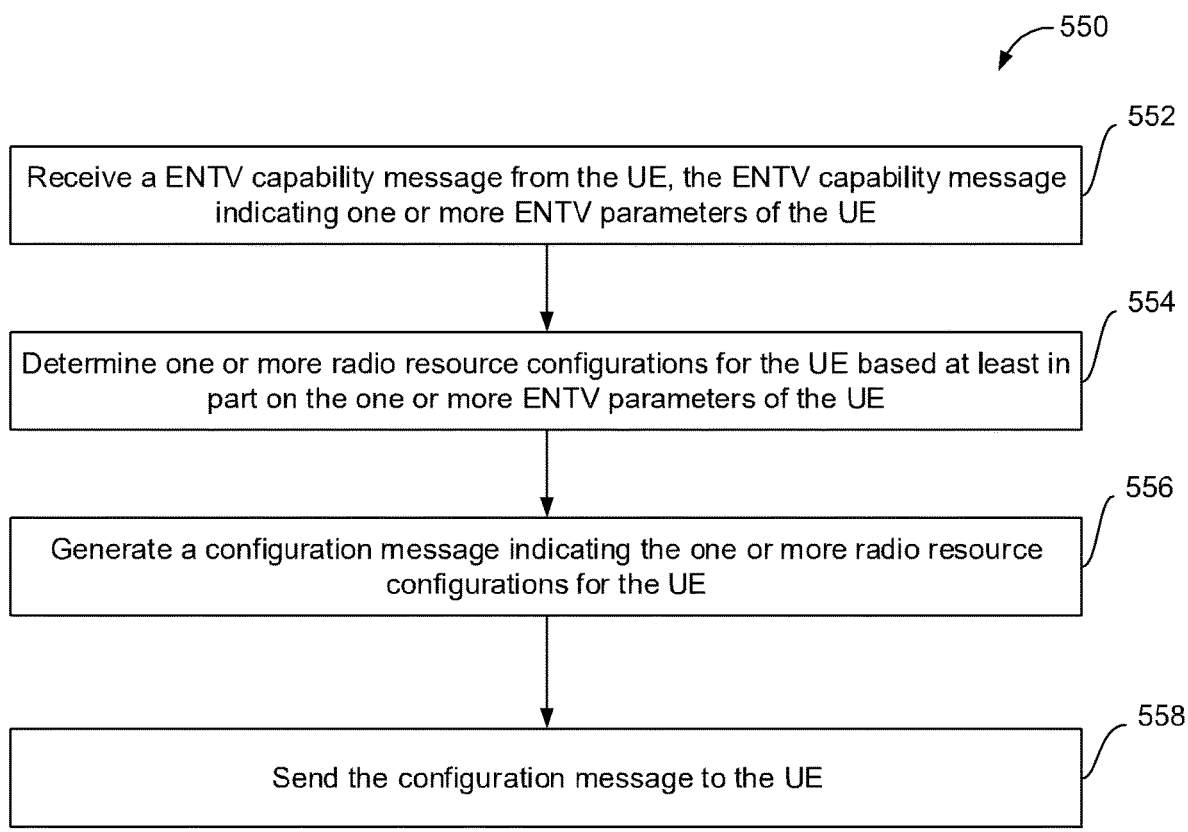
FIG. 5B is a process flow diagram illustrating a method for supporting ENTV service delivery to a UE in a 5G-NR RAN in accordance with various embodiments.

FIG. 5B shows a process flow diagram of an example method 550 for supporting ENTV service delivery to a UE in a 5G-NR RAN according to various embodiments. With reference to FIGS. 1A-5B, the method 550 may be implemented by a processor of a base station (e.g., the base station 110a, 164, 350, 452), such as a gNB.

In block 552, the processor may perform operations including receiving an ENTV capability message from the UE, the ENTV capability message indicating one or more ENTV parameters of the UE. In various embodiments, the one or more ENTV parameters may be one or more of a supported band list for ENTV, an access spectrum location for ENTV, a subcarrier spacing for ENTV, or a buffer capability for ENTV. In various embodiments, the ENTV capability message may be an RRC message or a SR message.

In block 554, the processor may perform operations including determining one or more radio resource configurations for the UE based at least in part on the one or more ENTV parameters of the UE. In various embodiments, a radio resource configuration may be a determined paging cycle.

In block 556, the processor may perform operations including generating a configuration message indicating the one or more radio resource configurations for the UE.

In block 558, the processor may perform operations including sending the configuration message to the UE.

FIG. 6 is schema of an example ENTV capability message 600 in accordance with various embodiments. With reference to FIGS. 1A-6, the ENTV capability message 600 may indicate one or more ENTV parameters including one or more of a supported band list for ENTV, an access spectrum location for ENTV, a subcarrier spacing for ENTV, or a buffer capability for ENTV. For example, the ENTV parameters may be include as additional information elements in an RRC message sent by the UE to a gNB. The additional information elements may enable ENTV capability reporting. At least the following ENTV related information elements may be reported by UE in the ENTV capability message 600, supported band list for ENTV, supported access spectrum location for ENTV, subcarrier spacing for ENTV, and buffer size for broadcasting reception.

Figure 7A:
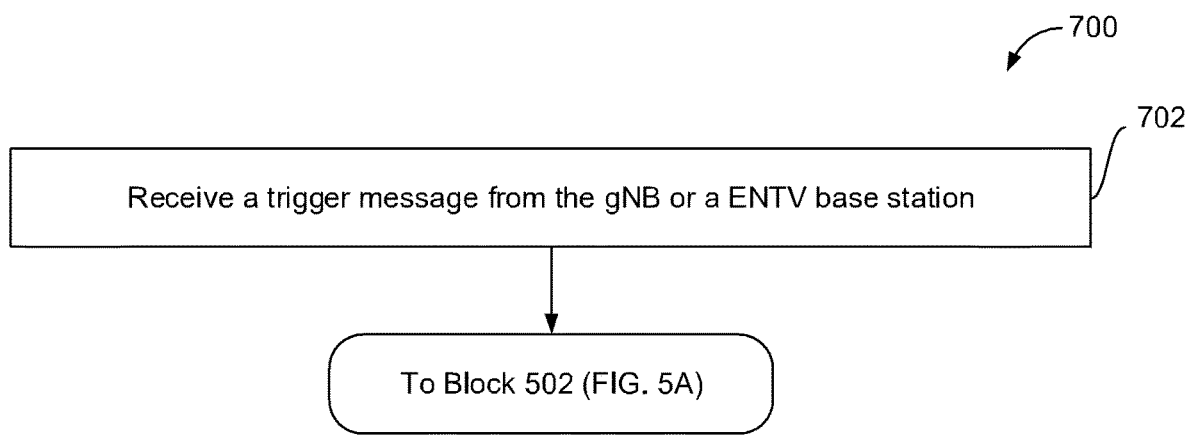
FIG. 7A is a process flow diagram illustrating a method for supporting ENTV service delivery to a UE in a 5G-NR RAN in accordance with various embodiments.

FIG. 7A shows a process flow diagram of an example method 700 for supporting ENTV service delivery to a UE in a 5G-NR RAN according to various embodiments. With reference to FIGS. 1A-7A, the method 700 may be implemented by a processor of a UE s 402 (e.g., UE 120a-120e, UE 170, SIP 200, UE 320, UE 402), one or more gNB 452 (e.g., the base station 110a, 164, 350) and/or one or more ENTV base stations 494 (e.g., the base station 110a, 154, 350). In various embodiments, the operations of method 700 may be performed in conjunction with the operations of methods 500 and/or 550.

In block 702, the processor may perform operations including receiving a trigger message from the gNB or an ENTV base station. The trigger message may be an RRC message received from a gNB or an SA received from an ENTV base station. The trigger message may be a request for ENTV capabilities of the UE. In various embodiments, in response to receiving the trigger message, the processor may generate the ENTV capability message in block 502.

Figure 7B:
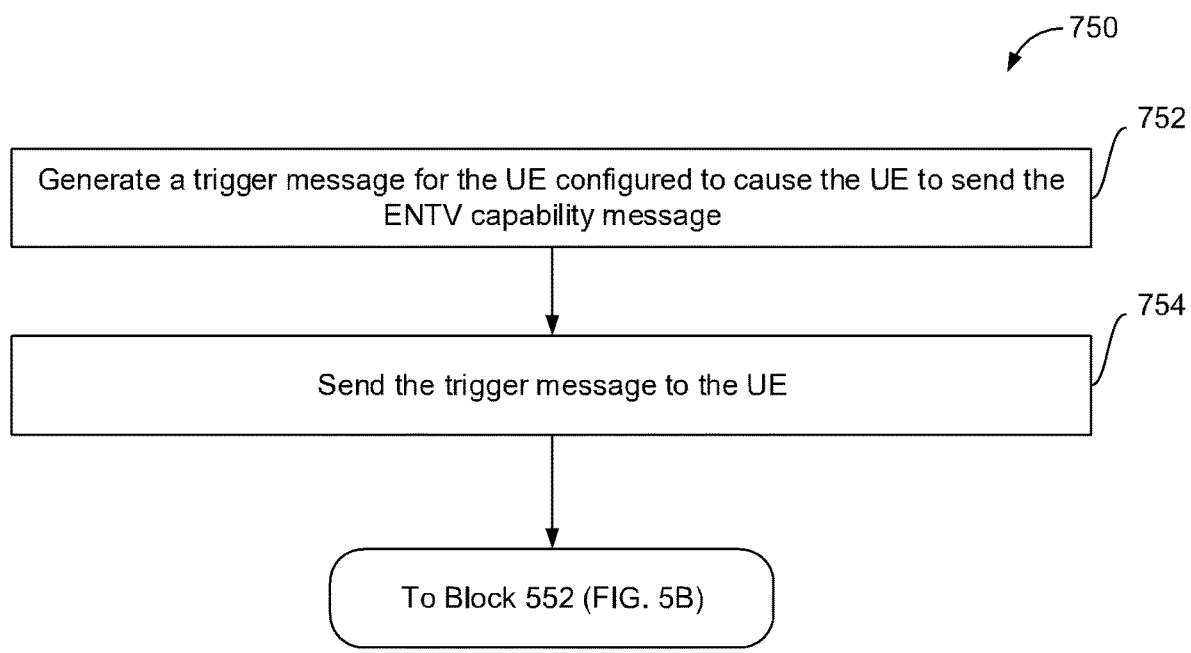
FIG. 7B is a process flow diagram illustrating a method for supporting ENTV service delivery to a UE in a 5G-NR RAN in accordance with various embodiments.

FIG. 7B shows a process flow diagram of an example method 750 for supporting ENTV service delivery to a UE in a 5G-NR RAN according to various embodiments. With reference to FIGS. 1A-7B, the method 750 may be implemented by a processor of a base station (e.g., the base station 110a, 164, 350, 452), such as a gNB. In various embodiments, the operations of method 750 may be performed in conjunction with the operations of methods 500, 550, and/or 700.

In block 752, the processor may perform operations including generating a trigger message for the UE configured to cause the UE to send the ENTV capability message. In various embodiments, the trigger message may be generated prior to receiving the ENTV capability message from the UE. In various embodiments, the trigger message may be an RRC message.

In block 754, the processor may perform operations including sending the trigger message to the UE.

Figure 7C:
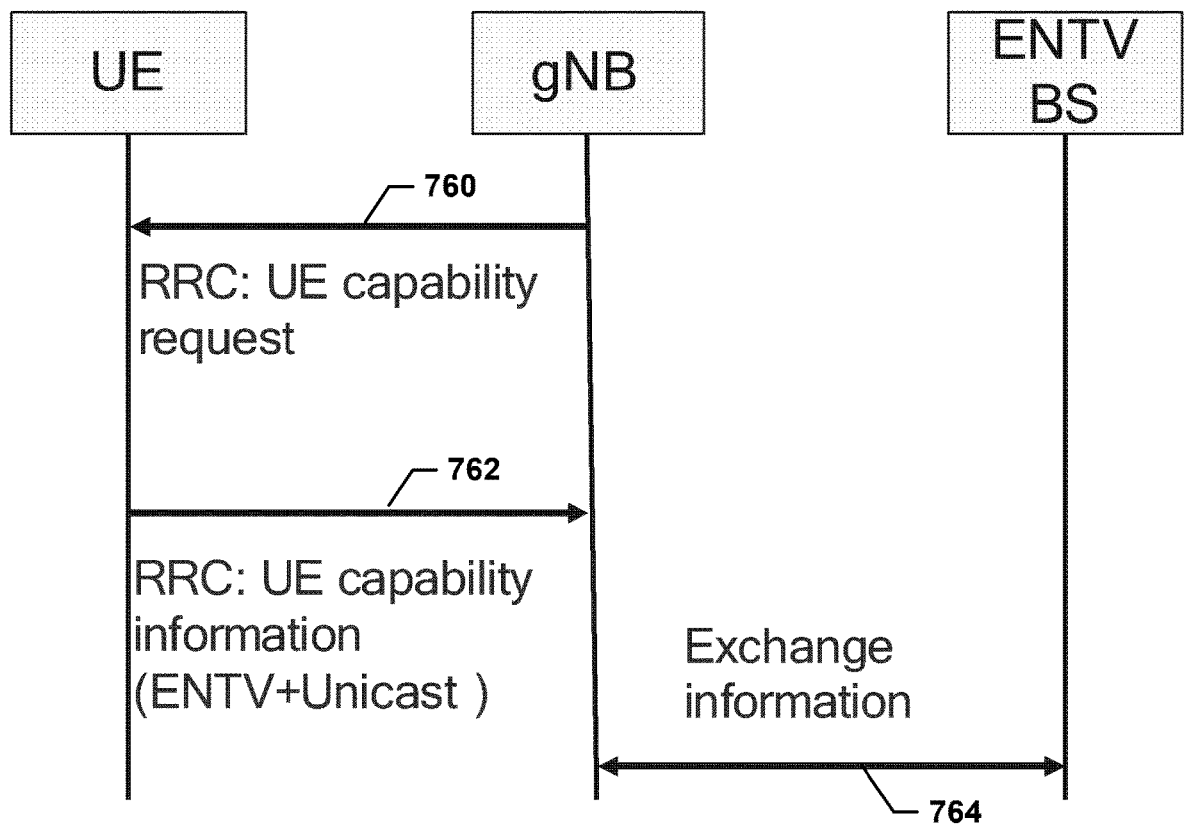
FIG. 7C is a call flow diagram illustrating example interactions between a UE, gNB, and ENTV base station in accordance with various embodiments.

FIG. 7C is a call flow diagram illustrating example interactions between a UE (e.g., UE 120a-120e, UE 170, SIP 200, UE 320, UE 402), gNB (e.g., the base station 110a, 164, 350, 452), and ENTV base station (e.g., the base station 110a, 154, 350, 454) in accordance with various embodiments. With reference to FIGS. 1A-7C, in operation 760, the gNB may send an RRC message to the UE including a UE capability request. In operation 762, the UE may send an RRC message including UE capability information related to ENTV capabilities and unicast capabilities of the UE to the gNB. In operation 764, the gNB and ENTV base station may exchange information including the UE capability information.

Figure 8:
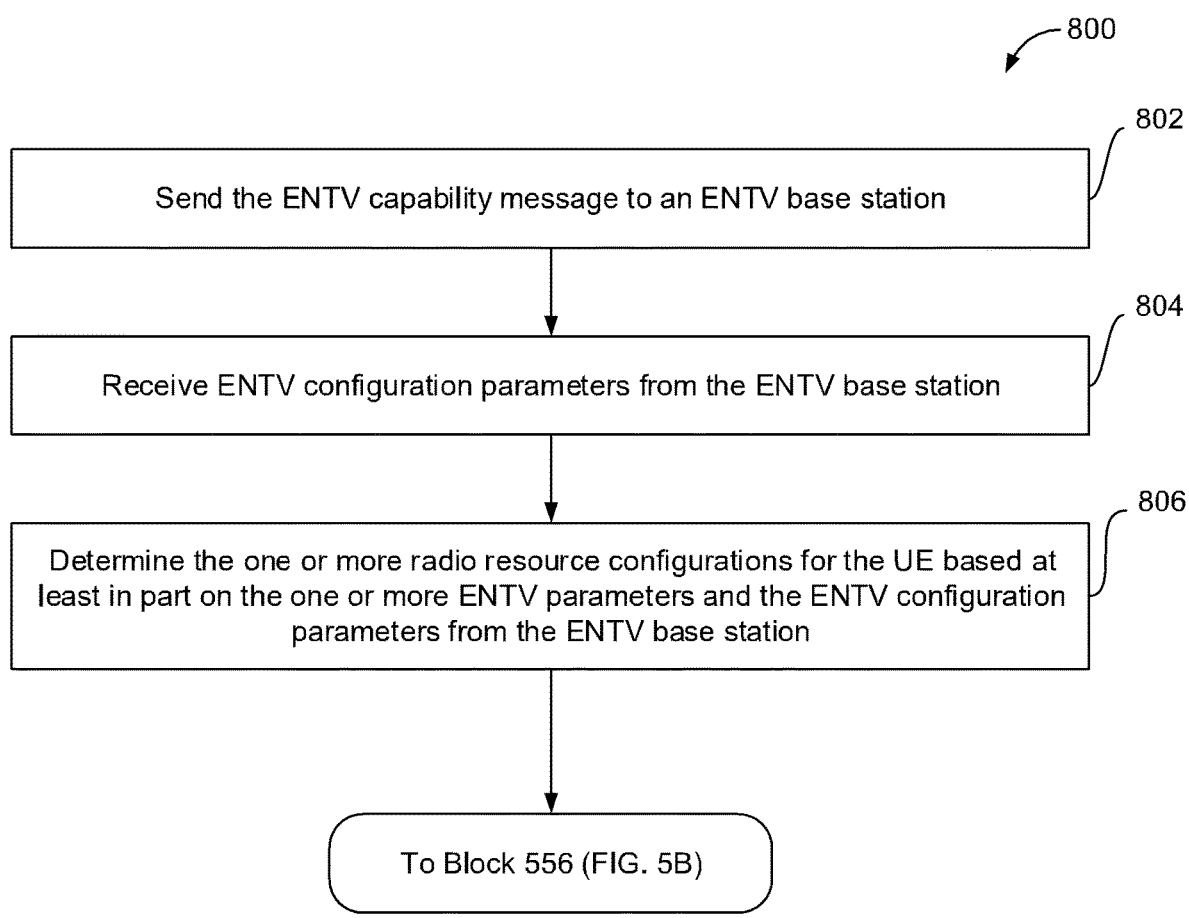
FIG. 8 is a process flow diagram illustrating a method for supporting ENTV service delivery to a UE in a 5G-NR RAN in accordance with various embodiments.

FIG. 8 shows a process flow diagram of an example method 800 for supporting ENTV service delivery to a UE in a 5G-NR RAN according to various embodiments. With reference to FIGS. 1A-8, the method 800 may be implemented by a processor of a base station (e.g., the base station 110a, 164, 350, 452), such as a gNB. In various embodiments, the operations of method 800 may be performed in conjunction with the operations of methods 500, 550, 700, and/or 750.

In block 802, the processor may perform operations including sending the ENTV capability message to an ENTV base station. In this manner, the ENTV base station may receive ENTV parameters of the UE, such as a supported band list for ENTV, an access spectrum location for ENTV, a subcarrier spacing for ENTV, and/or a buffer capability for ENTV.

In block 804, the processor may perform operations including receiving ENTV configuration parameters from the ENTV base station. In various embodiments, the ENTV configuration parameters from the ENTV base station may include ENTV paging cycle information.

In block 806, the processor may perform operations including determining the one or more radio resource configurations for the UE based at least in part on the one or more ENTV parameters and the ENTV configuration parameters from the ENTV base station.

Figure 9:
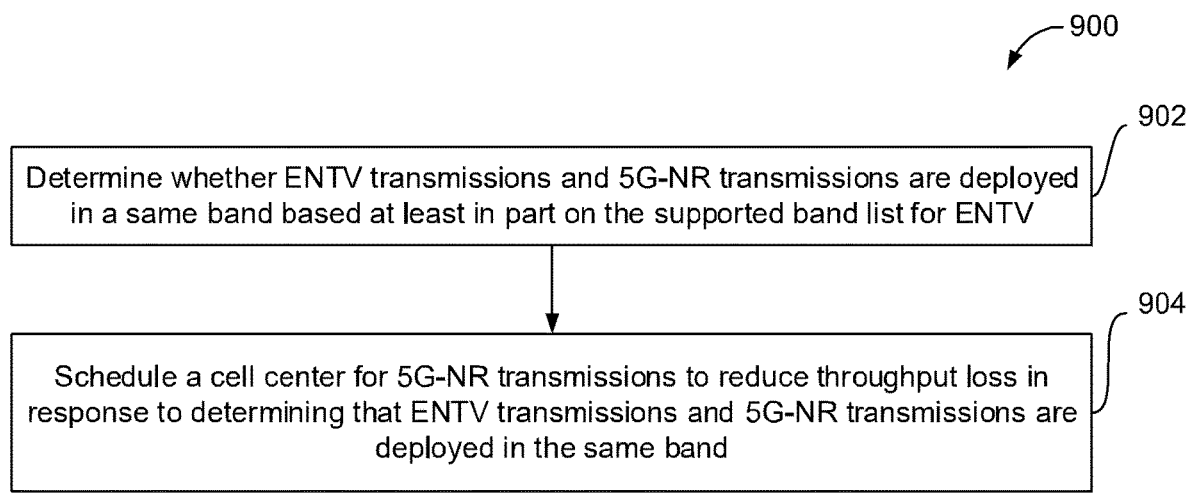
FIG. 9 is a process flow diagram illustrating a method for supporting ENTV service delivery to a UE in a 5G-NR RAN in accordance with various embodiments.

FIG. 9 shows a process flow diagram of an example method 900 for supporting ENTV service delivery to a UE in a 5G-NR RAN according to various embodiments. With reference to FIGS. 1A-9, the method 900 may be implemented by a processor of a base station (e.g., the base station 110a, 164, 350, 452), such as a gNB. In various embodiments, the operations of method 900 may be performed in conjunction with the operations of methods 500, 550, 700, 750, and/or 800.

In block 902, the processor may perform operations including determining whether ENTV transmissions and 5G-NR transmissions are deployed in a same band based at least in part on the supported band list for ENTV.

In block 904, the processor may perform operations including scheduling a cell center for 5G-NR transmissions based at least in part on a frequency domain used by ENTV broadcast only UEs to reduce throughput loss due to UE-to-UE interference or in-device interference in response to determining that ENTV transmissions and 5G-NR transmissions are deployed in the same band. In various embodiments, the scheduled cell center may be at least one of the one or more radio resource configurations for the UE sent to the UE in the configuration message.

Figure 10:
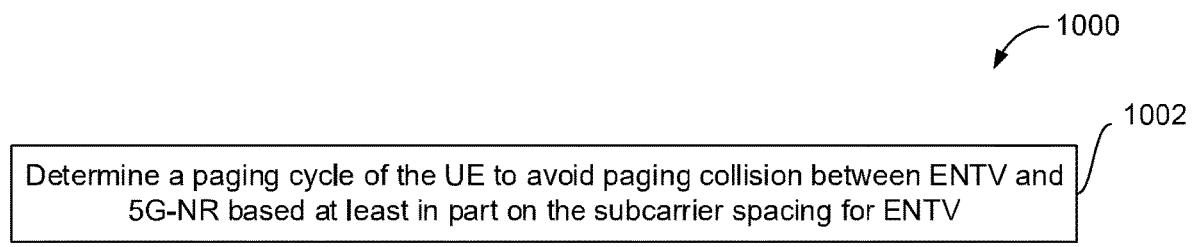
FIG. 10 is a process flow diagram illustrating a method for supporting ENTV service delivery to a UE in a 5G-NR RAN in accordance with various embodiments.

FIG. 10 shows a process flow diagram of an example method 1000 for supporting ENTV service delivery to a UE in a 5G-NR RAN according to various embodiments. With reference to FIGS. 1A-10, the method 1000 may be implemented by a processor of a base station (e.g., the base station 110a, 164, 350, 452), such as a gNB. In various embodiments, the operations of method 1000 may be performed in conjunction with the operations of methods 500, 550, 700, 750, 800, and/or 900.

In block 1002, the processor may perform operations including determining a paging cycle of the UE to avoid paging collision between ENTV and 5G-NR based at least in part on the subcarrier spacing for ENTV. In various embodiments, the determined paging cycle may be at least one of the one or more radio resource configurations for the UE sent to the UE in the configuration message.

Figure 11:
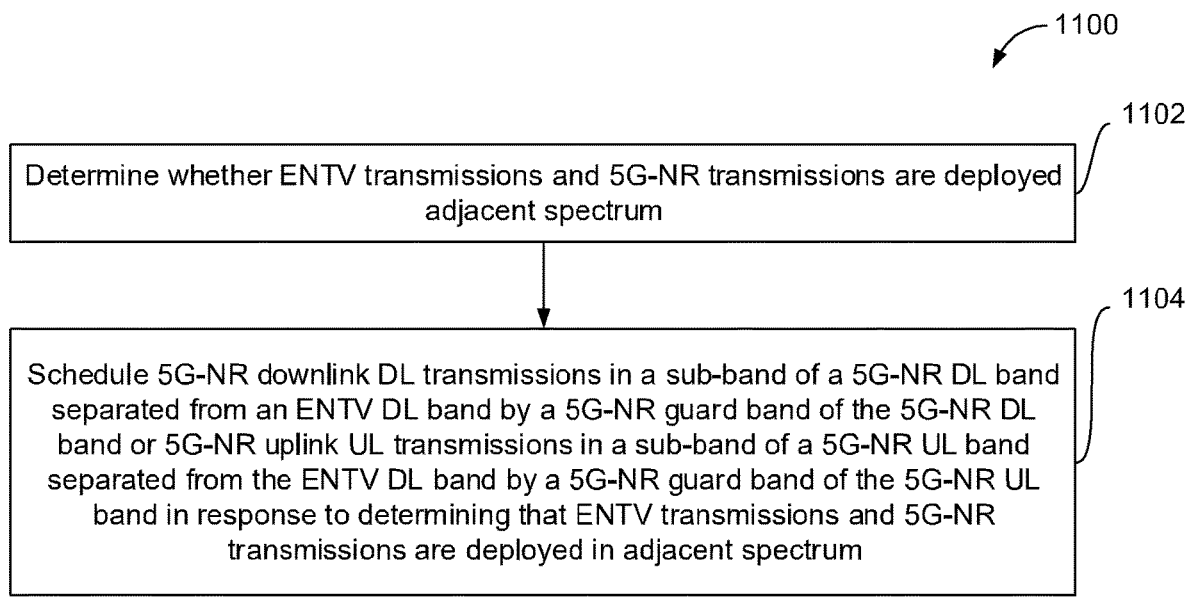
FIG. 11 is a process flow diagram illustrating a method for supporting ENTV service delivery to a UE in a 5G-NR RAN in accordance with various embodiments.

FIG. 11 shows a process flow diagram of an example method 1100 for supporting ENTV service delivery to a UE in a 5G-NR RAN according to various embodiments. With reference to FIGS. 1A-11, the method 1100 may be implemented by a processor of a base station (e.g., the base station 110a, 164, 350, 452), such as a gNB. In various embodiments, the operations of method 1100 may be performed in conjunction with the operations of methods 500, 550, 700, 750, 800, 900, and/or 1000.

In block 1102, the processor may perform operations including determining whether ENTV transmissions and 5G-NR transmissions are deployed in adjacent spectrum.

In block 1104, in response to determining that ENTV transmissions and 5G-NR transmissions are deployed in adjacent spectrum the processor may perform operations including scheduling: 5G-NR DL transmissions in a sub-band of a 5G-NR DL band separated from an ENTV DL band by a 5G-NR guard band of the 5G-NR DL band or a ENTV guard band of the ENTV DL band; or 5G-NR uplink UL transmissions in a sub-band of a 5G-NR UL band separated from the ENTV DL band by a 5G-NR guard band of the 5G-NR UL band or a ENTV guard band of the ENTV DL band.

Figure 12:
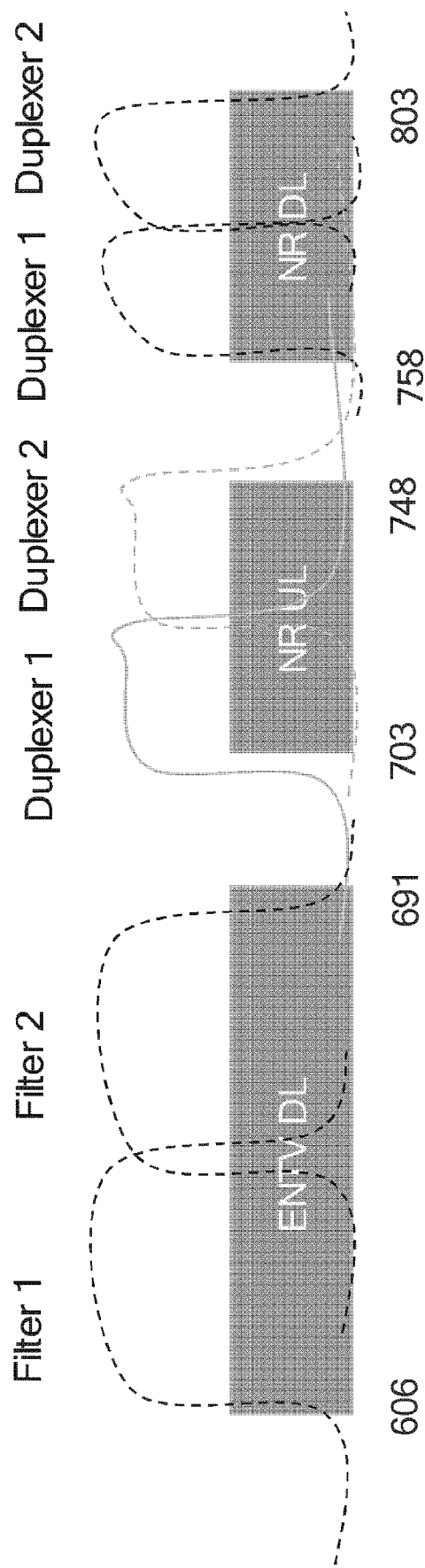
FIG. 12 is a diagram of scheduled uplink and downlink transmissions in accordance with various embodiments.

FIG. 12 is a diagram of scheduled uplink and downlink transmissions in accordance with various embodiments. With reference to FIGS. 1A-12, FIG. 12 may illustrate an example implementation of the operations of method 1100. As a specific example, when there are multiple filters, e.g. 2 filters "Filter 1" and "Filter 2" in FIG. 12, to cover the whole ENTV broadcast and NR unicast assigned spectrum, ENTV broadcast and NR unicast may be deployed in adjacent spectrum. As such, there may be interference from NR UL to ENTV DL in a UE device when ENTV and unicast are working simultaneously. To prevent such in-device interference, the ENTV UE may report the access spectrum location (e.g., access through Filter 2 (upper ENTV spectrum)) to the gNB. With this information on the access spectrum location (e.g., Filter 2), the gNB can schedule the NR DL in Duplexer 2 (NR upper spectrum) to increase the guard band between the ENTV broadcast mode and the ENTV unicast mode (i.e., the NR bands). The similar method may be applied for lower spectrum (e.g., when the UE uses Filter 1) and Duplexer 1 (NR lower spectrum) may then be used.

Figure 13:
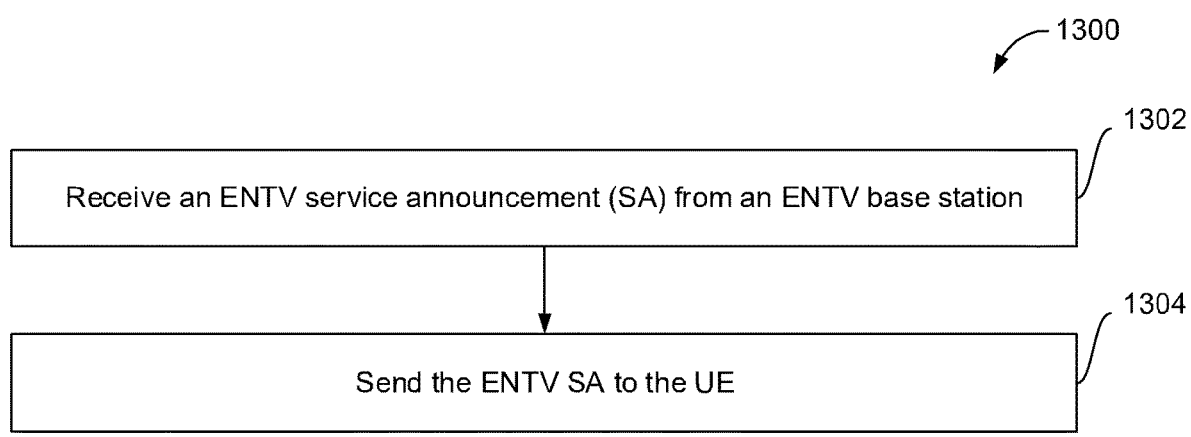
FIG. 13 is a process flow diagram illustrating a method for supporting ENTV service delivery to a UE in a 5G-NR RAN in accordance with various embodiments.

FIG. 13 shows a process flow diagram of an example method 1300 for supporting ENTV service delivery to a UE in a 5G-NR RAN according to various embodiments. With reference to FIGS. 1A-13, the method 1300 may be implemented by a processor of a base station (e.g., the base station 110a, 164, 350, 452), such as a gNB. In various embodiments, the operations of method 1300 may be performed in conjunction with the operations of methods 500, 550, 700, 750, 800, 900, 1000, and/or 1100.

In block 1302, the processor may perform operations including receiving an ENTV SA from an ENTV base station.

In block 1304, the processor may perform operations including sending the ENTV SA to the UE. The provisioning of the ENTV SA to the UE through the gNB may reduce UE switching as the UE may not need to switch to ENTV broadcast to determine the available ENTV services.

Figure 14:
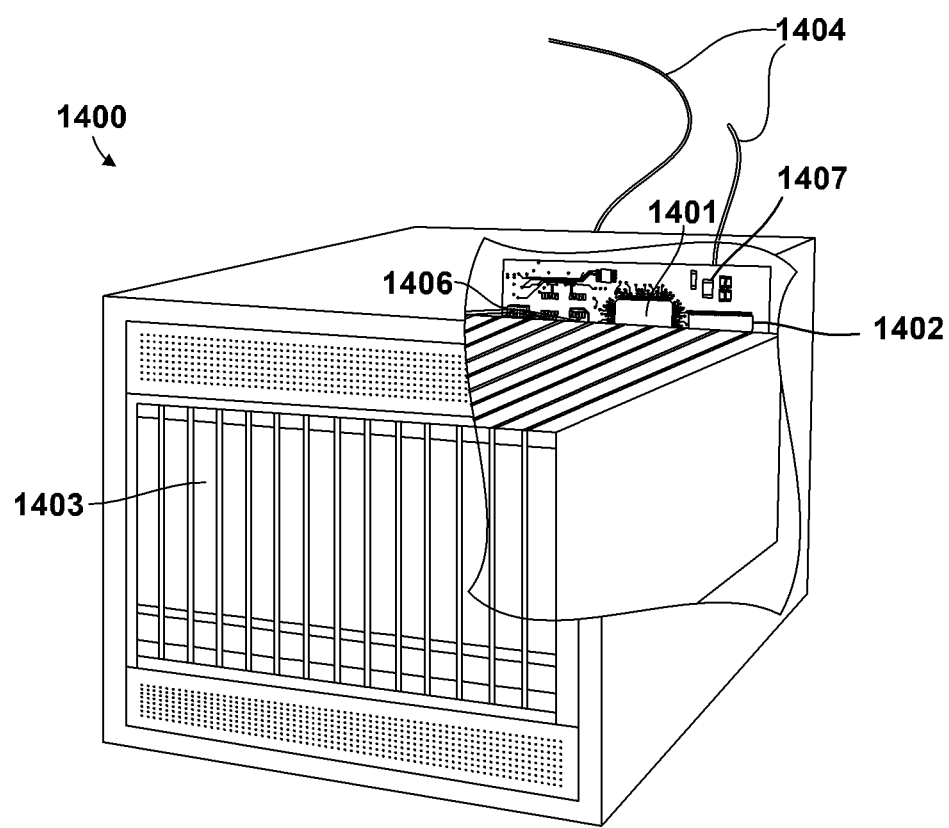
FIG. 14 of a network computing device suitable for supporting ENTV service delivery in accordance with various embodiments.

Various embodiments may be implemented on a variety of wireless network devices, an example of which is illustrated in FIG. 14 in the form of a wireless network computing device 1400 functioning as a network element of a communication network, such as a base station (e.g., the base station 110a, 350). Such network computing devices may include at least the components illustrated in FIG. 14. With reference to FIGS. 1-14, the network computing device 1400 may typically include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more antennas 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
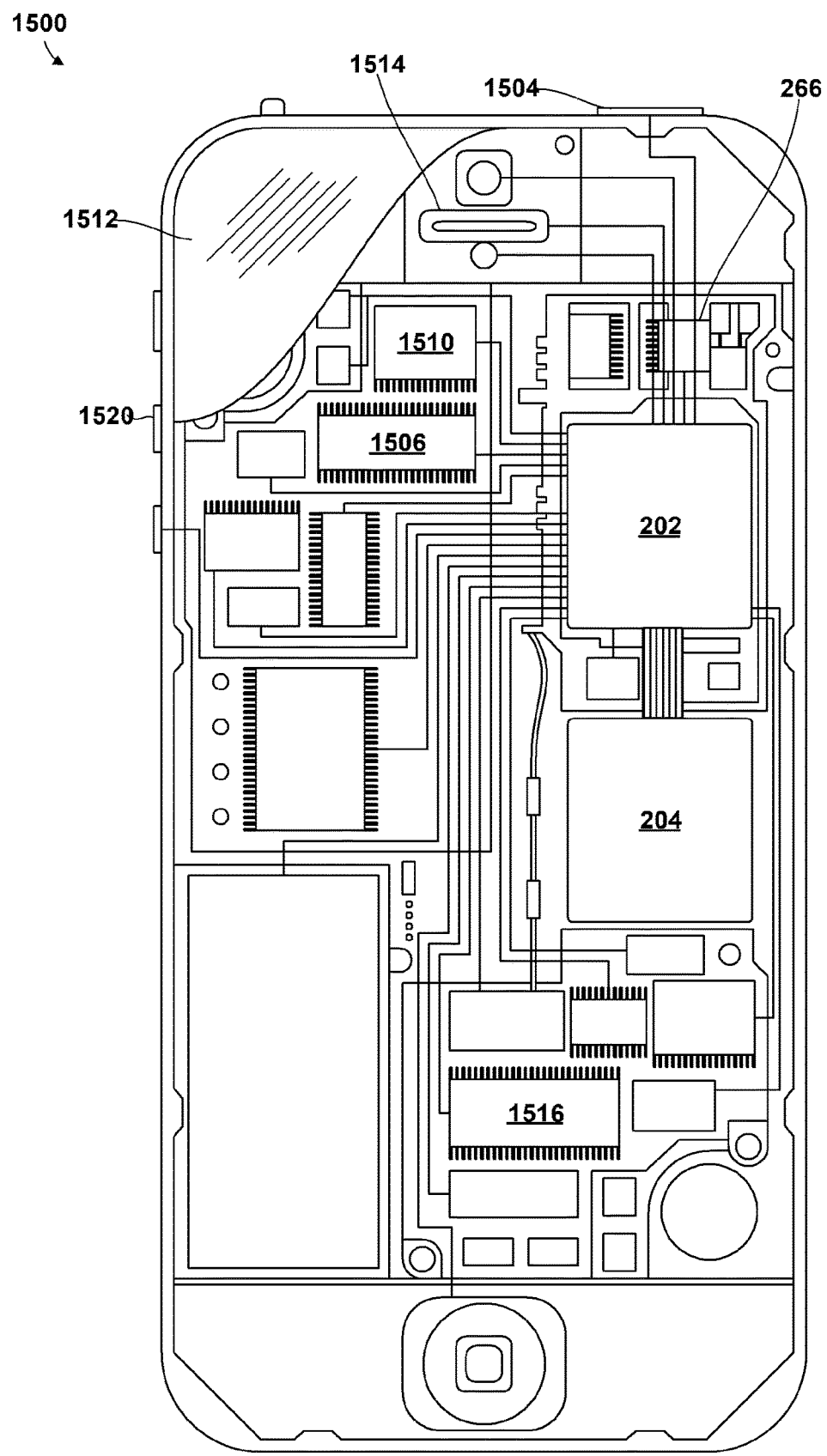
FIG. 15 is a component block diagram of a wireless communication device suitable for supporting ENTV service delivery in accordance with various embodiments.

Various embodiments may be implemented on a variety of wireless devices (e.g., the wireless device 120a-120e, 200, 320), an example of which is illustrated in FIG. 15 in the form of a smartphone 1500. With reference to FIGS. 1-15, the smartphone 1500 may include a first SOC 202 (e.g., a SOC-CPU) coupled to a second SOC 204 (e.g., a 5G capable SOC). The first and second SOCs 202, 204 may be coupled to internal memory 1506, 1516, a display 1512, and to a speaker 1514. Additionally, the smartphone 1500 may include an antenna 1504 for sending and receiving electromagnetic radiation that may be connected to a wireless data link and/or cellular telephone transceiver 266 coupled to one or more processors in the first and/or second SOCs 202, 204. Smartphones 1500 typically also include menu selection buttons or rocker switches 1520 for receiving user inputs.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1510 may include a digital signal processor (DSP) circuit (not shown separately).

The processors of the wireless network computing device 1400 and the smart phone 1500 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1506, 1516 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and 600 may be substituted for or combined with one or more operations of the methods 500 and 600.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting Enhancement for Television (ENTV) service delivery to a user equipment (UE) in a new radio (NR) radio access network (RAN), comprising:
generating, by one or more processors of the UE, an ENTV capability message, the ENTV capability message indicating one or more ENTV parameters of the UE;
sending, by the one or more processors of the UE, the ENTV capability message to a network entity of the NR RAN; and
receiving, by the one or more processors of the UE, a configuration message indicating one or more radio resource configurations for the UE, wherein the one or more radio resource configurations are based at least in part on the one or more ENTV parameters.

2. The method of claim 1, wherein the one or more ENTV parameters comprise one or more of a supported band list for ENTV, an access spectrum location for ENTV, a subcarrier spacing for ENTV, or a buffer capability for ENTV.

3. The method of claim 1, wherein the ENTV capability message is a radio resource control (RRC) message or a scheduling request (SR) message.

4. The method of claim 1, wherein ENTV service is received via unicast transmissions with the network entity or via broadcast transmissions from an ENTV base station.

5. A method for supporting Enhancement for Television (ENTV) service delivery to a user equipment (UE) in a new radio (NR) radio access network (RAN), comprising:
receiving, by one or more processors of a network entity of the NR RAN, an ENTV capability message from the UE, the ENTV capability message indicating one or more ENTV parameters of the UE;
generating, by the one or more processors of the network entity, a configuration message indicating one or more radio resource configurations for the UE, wherein the one or more radio resource configurations are based on the one or more ENTV parameters; and
sending, by the one or more processors of the network entity, the configuration message to the UE.

6. The method of claim 5, further comprising:
sending, by the one or more processors of the network entity, the ENTV capability message to an ENTV base station.

7. The method of claim 5, wherein the ENTV capability message is a radio resource control (RRC) message or a scheduling request (SR) message.

8. The method of claim 5, wherein the one or more ENTV parameters comprise a buffer capability for ENTV.

9. The method of claim 5, wherein the one or more ENTV parameters comprise a supported band list for ENTV.

10. The method of claim 9, further comprising:
determining, by the one or more processors of the network entity, whether ENTV transmissions and NR transmissions are deployed in a same band based on the supported band list for ENTV; and
scheduling, by the one or more processors of the network entity, a cell center for NR transmissions based on a frequency domain used by ENTV UEs to reduce throughput loss due to UE-to-UE interference or in-device interference in response to determining that ENTV transmissions and NR transmissions are deployed in the same band,
wherein the scheduled cell center is included in one or more parameters of at least one of the one or more radio resource configurations for the UE.

11. The method of claim 5, wherein the one or more ENTV parameters comprise a subcarrier spacing for ENTV.

12. The method of claim 11, further comprising:
determining, by the one or more processors of the network entity, a paging cycle of the UE to avoid paging collision between ENTV and NR based on the subcarrier spacing for ENTV,
wherein the determined paging cycle is included in one or more parameters of at least one of the one or more radio resource configurations for the UE.

13. The method of claim 5, further comprising:
determining, by the one or more processors of the network entity, whether ENTV transmissions and NR transmissions are deployed in adjacent spectrum in response to the one or more ENTV parameters comprising an access spectrum location for ENTV; and
in response to determining that ENTV transmissions and NR transmissions are deployed in adjacent spectrum, scheduling by the one or more processors of the network entity:
NR downlink (DL) transmissions in a sub-band of a NR DL band separated from an ENTV DL band by a NR guard band of the NR DL band or an ENTV guard band of the ENTV DL band; or
NR uplink (UL) transmissions in a sub-band of a NR UL band separated from the ENTV DL band by a NR guard band of the NR UL band or a ENTV guard band of the ENTV DL band.

14. The method of claim 5, wherein the ENTV capability message includes ENTV paging cycle information.

15. The method of claim 5, further comprising:
receiving, by the one or more processors of the network entity, an ENTV service announcement (SA) from an ENTV base station; and
sending, by the one or more processors of the network entity, the ENTV SA to the UE.

16. A user equipment (UE), comprising:
one or more radio resources; and
one or more processors configured, individually or in any combination, to:
generate an Enhancement for Television (ENTV) capability message, the ENTV capability message indicating one or more ENTV parameters of the UE;
send the ENTV capability message to a network entity of a new radio (NR) radio access network (RAN); and
receive a configuration message indicating one or more radio resource configurations for the UE, wherein the one or more radio resource configurations are based on the one or more ENTV parameters.

17. The UE of claim 16, wherein the one or more ENTV parameters comprise one or more of a supported band list for ENTV, an access spectrum location for ENTV, a subcarrier spacing for ENTV, or a buffer capability for ENTV.

18. The UE of claim 16, wherein ENTV capability message is a radio resource control (RRC) message or a scheduling request (SR) message.

19. The UE of claim 16, wherein ENTV service is received via unicast transmissions with the network entity or via broadcast transmissions from an ENTV base station.

20. A network entity of a new radio (NR) radio access network (RAN), comprising:
one or more processors configured, individually or in any combination, to:

receive an Enhancement for Television (ENTV) capability message from a User Equipment (UE), the ENTV capability message indicating one or more ENTV parameters of the UE;
generate a configuration message indicating one or more radio resource configurations for the UE, wherein the one or more radio resource configurations are based on the one or more ENTV parameters; and
send the configuration message to the UE.

21. The network entity of claim 20, wherein the one or more processors are further configured to:
send the ENTV capability message to an ENTV base station.

22. The network entity of claim 20, wherein the ENTV capability message is a radio resource control (RRC) message or a scheduling request (SR) message.

23. The network entity of claim 20, wherein the one or more ENTV parameters comprise a supported band list for ENTV.

24. The network entity of claim 23, wherein the one or more processors are configured to:
determine whether ENTV transmissions and NR transmissions are deployed in a same band based on the supported band list for ENTV; and
schedule a cell center for NR transmissions based on a frequency domain used by ENTV UEs to reduce throughput loss due to UE-to-UE interference or in-device interference in response to determining that ENTV transmissions and NR transmissions are deployed in the same band, and
wherein the scheduled cell center is included in one or more parameters of at least one of the one or more radio resource configurations for the UE.

25. The network entity of claim 20, wherein the one or more ENTV parameters comprise a subcarrier spacing for ENTV.

26. The network entity of claim 25, wherein the one or more processors are further configured to:
determine a paging cycle of the UE to avoid paging collision between ENTV and NR based on the subcarrier spacing for ENTV, and
wherein the determined paging cycle is included in one or more parameters of at least one of the one or more radio resource configurations for the UE.

27. The network entity of claim 20, wherein the one or more processors are further configured to:
determine whether ENTV transmissions and NR transmissions are deployed in adjacent spectrum in response to the one or more ENTV parameters comprising an access spectrum location for ENTV; and
in response to determining that ENTV transmissions and NR transmissions are deployed in adjacent spectrum, schedule:
NR downlink (DL) transmissions in a sub-band of a NR DL band separated from an ENTV DL band by a NR guard band of the NR DL band or an ENTV guard band of the ENTV DL band; or
NR uplink (UL) transmissions in a sub-band of a NR UL band separated from the ENTV DL band by a NR guard band of the NR UL band or an ENTV guard band of the ENTV DL band.

28. The network entity of claim 20, wherein the ENTV capability message includes ENTV paging cycle information.

29. The network entity of claim 20, wherein the one or more processors are further configured to:
receive an ENTV service announcement (SA) from an ENTV base station; and
send the ENTV SA to the UE.

* * * * *